United States Patent
Chu et al.

(10) Patent No.: US 11,653,344 B2
(45) Date of Patent: *May 16, 2023

(54) PUNCTURED OPERATING CHANNELS IN WLAN

(71) Applicant: Marvell Asia Pte, Ltd., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 178 days.

This patent is subject to a terminal disclaimer.

(21) Appl. No.: 17/213,857

(22) Filed: Mar. 26, 2021

(65) Prior Publication Data

US 2021/0219291 A1 Jul. 15, 2021

Related U.S. Application Data

(63) Continuation of application No. 16/399,782, filed on Apr. 30, 2019, now Pat. No. 10,966,200.

(Continued)

(51) Int. Cl.
*H04W 72/04* (2009.01)
*H04W 72/0453* (2023.01)
(Continued)

(52) U.S. Cl.
CPC ....... *H04W 72/0453* (2013.01); *H04L 5/0039* (2013.01); *H04W 84/12* (2013.01)

(58) Field of Classification Search
CPC ............. H04W 72/0453; H04W 84/12; H04W 74/002; H04W 74/0816; H04W 28/20; H04L 5/0039
See application file for complete search history.

(56) References Cited

U.S. PATENT DOCUMENTS 10,257,806 B2   4/2019   Chu et al.
10,349,413 B2   7/2019   Zhang et al.
(Continued)

FOREIGN PATENT DOCUMENTS

EP   2028809 A2   2/2009
EP   2999252 A1   3/2016
(Continued)

OTHER PUBLICATIONS

Deng et al., "IEEE 802.11 ax: Highly Efficient WLANs for Intelligent Information Infrastructure," IEEE Communications Magazine, pp. 52-53 (Dec. 2017).
Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).
(Continued)

*Primary Examiner* — Walli Z Butt

(57) ABSTRACT

An AP determines an overall frequency bandwidth of an operating channel of a WLAN, and one or more punctured sub-channels for the operating channel. The AP transmits a first packet to one or more client stations of the WLAN, the first packet specifying i) the overall frequency bandwidth of the operating channel, and ii) the one or more punctured sub-channels. The AP receives a second packet that includes an RTS frame from a first client station. The AP determines that one or more sub-channels in the operating channel are not idle from the standpoint of the AP, and in response to receiving the second packet, the AP transmits a third packet that includes a CTS frame that indicates to the one or more client stations of the WLAN that only a subset of sub-channels in the operating channel is reserved for a transmit opportunity of the first client station.

24 Claims, 19 Drawing Sheets

Related U.S. Application Data

(60) Provisional application No. 62/668,703, filed on May 8, 2018.

(51) Int. Cl.
*H04L 5/00* (2006.01)
*H04W 84/12* (2009.01)

(56) References Cited

U.S. PATENT DOCUMENTS

| | | | |
|---|---|---|---|
| 10,966,200 B2 * | 3/2021 | Chu | H04W 28/20 |
| 2011/0249659 A1 | 10/2011 | Fontaine et al. | |
| 2016/0212748 A1 | 7/2016 | Yang et al. | |
| 2017/0041171 A1 * | 2/2017 | Li | H04L 5/0053 |
| 2017/0149547 A1 | 5/2017 | Kim et al. | |
| 2017/0181130 A1 * | 6/2017 | Bharadwaj | H04W 72/12 |
| 2017/0181136 A1 | 6/2017 | Bharadwaj et al. | |
| 2017/0311204 A1 | 10/2017 | Cariou et al. | |
| 2017/0325178 A1 * | 11/2017 | Verma | H04W 52/146 |
| 2017/0366329 A1 | 12/2017 | Cao et al. | |
| 2018/0115403 A1 | 4/2018 | Sakai et al. | |
| 2018/0302858 A1 | 10/2018 | Son et al. | |
| 2019/0123863 A1 | 4/2019 | Zhang et al. | |
| 2019/0182714 A1 | 6/2019 | Chu et al. | |
| 2019/0182863 A1 | 6/2019 | Chu et al. | |
| 2019/0327740 A1 * | 10/2019 | Verma | H04L 5/0044 |
| 2019/0349930 A1 | 11/2019 | Chu et al. | |

FOREIGN PATENT DOCUMENTS

| | | |
|---|---|---|
| GB | 2501898 A | 11/2013 |
| JP | 2019503151 A | 1/2019 |
| JP | 2019515566 A | 6/2019 |
| WO | WO-2006/000955 A1 | 1/2006 |
| WO | WO-2012/026779 A2 | 3/2012 |
| WO | WO-2015/099803 A1 | 7/2015 |
| WO | WO-2017/026937 A1 | 2/2017 |
| WO | WO-2017/111567 A2 | 6/2017 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

International Search Report and Written Opinion in International Patent Application No. PCT/US2019/030050, dated Jun. 27, 2019 (15 pages).

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

Communication pursuant to Article 94(3) EPC for European Patent Application No. 19725256.2, dated Jan. 24, 2023. (11 pages).

Notice of Reasons of Refusal for Japanese Application No. 2020-563435, dated Feb. 8, 2023 (7 pages).

* cited by examiner

| Channel Width 904 | 160/ 80+80 BW | No LDPC | Rx NSS | Rx NSS Type |
|---|---|---|---|---|

Bits:     2      1      1      3      1

| Rx NSS | Channel Width 1004 | UL MU Disable | Tx NSTS | ER SU Disable | DL MU-MIMO Resound Recommendation | UL MU Disable |
|---|---|---|---|---|---|---|

Bits:    3    2    1    3    1    1    1

FIG. 11A

| Element ID 1104 | Length | Element ID – Extension | HE MAC Capabilities Information | HE PHY Capabilities Information | Supported HE-MCS and $N_{SS}$ Set 1108 | PPE Thresholds |
|---|---|---|---|---|---|---|
| 1 | 1 | 1 | 7 | 9 | 4, 8, or 12 | variable |

Octets:

| RX HE-MCS Map ≤ 80 MHz 1132 | TX HE-MCS Map ≤ 80 MHz 1136 | RX HE-MCS Map 160 MHz 1140 | TX HE-MCS Map 160 MHz 1144 | RX HE-MCS Map 80+80 MHz 1148 | TX HE-MCS Map 80+80 MHz 1152 |
|---|---|---|---|---|---|
| 2 | 2 | 0 or 2 | 0 or 2 | 0 or 2 | 0 or 2 |

Octets:

| RX HE-MCS Map ≤ 80 MHz 1174 | TX HE-MCS Map ≤ 80 MHz 1178 | RX HE-MCS Map > 80 MHz and ≤ 160 MHz 1182 | TX HE-MCS Map > 80 MHz and ≤ 160 MHz 1186 | RX HE-MCS Map > 80 MHz and ≤ 80+80 MHz 1190 | TX HE-MCS Map > 80 MHz and ≤ 80+80 MHz 1194 |
|---|---|---|---|---|---|
| 2 | 2 | 0 or 2 | 0 or 2 | 0 or 2 | 0 or 2 |

Octets:

← 1170

PUNCTURED OPERATING CHANNELS IN WLAN

CROSS REFERENCES TO RELATED APPLICATIONS

This application is a continuation of U.S. patent application Ser. No. 16/399,782 (now U.S. Pat. No. 10,966,200) entitled "Punctured Operating Channels in WLAN," filed Apr. 29, 2019, which claims the benefit of U.S. Provisional Patent Application No. 62/668,703, entitled "Channel Puncture with Multiple RUs to Single Destination," filed on May 8, 2018. Both applications identified above are hereby incorporated herein by reference in their entireties.

FIELD OF TECHNOLOGY

The present disclosure relates generally to wireless communication systems, and more particularly to media access control for transmission and reception over multiple communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard now under development significantly improves throughput over the IEEE 802.11ac Standard.

SUMMARY

In an embodiment, a method for communicating in a wireless local area network (WLAN) includes: determining, at an access point (AP) of the WLAN, an overall frequency bandwidth of an operating channel of the WLAN, wherein the overall frequency bandwidth spans a plurality of sub-channels; determining, at the AP, one or more punctured sub-channels for the operating channel, the one or more punctured sub-channels disallowed for use in the WLAN, wherein the one or more punctured sub-channels are within the overall frequency bandwidth of the operating channel; transmitting, by the AP, a first packet to one or more client stations of the WLAN, the first packet including information that specifies i) the overall frequency bandwidth of the operating channel, and ii) the one or more punctured sub-channels for the operating channel, wherein the first packet informs the one or more client stations of the operating channel for future transmissions by the one or more client stations; receiving, at the AP, a second packet that includes a request-to-send (RTS) frame from a first client station among the one or more client stations, the second packet received via a plurality of sub-channels included in the operating channel, the plurality of sub-channels not including any of the one or more punctured sub-channels; determining, at the AP, that one or more sub-channels among the plurality of sub-channels are not idle from the standpoint of the AP; in response to receiving the second packet, transmitting, by the AP, a third packet that includes a clear-to-send (CTS) frame, the third packet transmitted via only a subset of sub-channels and indicating to the one or more client stations of the WLAN that the only the subset of sub-channels is reserved for a transmit opportunity (TXOP) of the first client station, the only the subset of sub-channels excluding the one or more sub-channels that are not idle from the standpoint of the AP; and after transmitting the third packet, receiving, at the AP, a fourth packet from the first client station via the only the subset of sub-channels.

In another embodiment, an AP comprises a wireless network interface device implemented using one or more integrated circuit (IC) devices. The wireless network interface device is configured to: determine an overall frequency bandwidth of an operating channel of a WLAN, wherein the overall frequency bandwidth spans a plurality of sub-channels; determine one or more punctured sub-channels for the operating channel, the one or more punctured sub-channels disallowed for use in the WLAN, wherein the one or more punctured sub-channels are within the overall frequency bandwidth of the operating channel; transmit a first packet to one or more client stations of the WLAN, the first packet including information that specifies i) the overall frequency bandwidth of the operating channel, and ii) the one or more punctured sub-channels for the operating channel, wherein the first packet informs the one or more client stations of the operating channel for future transmissions by the one or more client stations; receive a second packet that includes an RTS frame from a first client station among the one or more client stations, the second packet received via a plurality of sub-channels included in the operating channel, the plurality of sub-channels not including any of the one or more punctured sub-channels; determine that one or more sub-channels among the plurality of sub-channels are not idle from the standpoint of the AP; in response to receiving the second packet, transmit a third packet that includes a CTS frame, the third packet transmitted via only a subset of sub-channels and indicating to the one or more client stations of the WLAN that the only the subset of sub-channels is reserved for a TXOP of the first client station, the only the subset of sub-channels excluding the one or more sub-channels that are not idle from the standpoint of the AP; and after transmitting the third packet, receive a fourth packet from the first client station via the only the subset of sub-channels.

BRIEF DESCRIPTION OF THE DRAWINGS

FIG. 9 is a diagram of an example field for conveying operating mode change information for a WLAN, according to an embodiment.

FIG. 10 is a diagram of another example field for conveying operating mode change information for a WLAN, according to another embodiment.

FIG. 11A is a diagram of an example IE for reporting capability information to other communication devices in a WLAN, according to an embodiment.

FIG. 11B is a diagram of an example format of one of the fields of the IE of FIG. 11A, according to an embodiment.

FIG. 11C is a diagram of another example format of one of the fields of the IE of FIG. 11A, according to an embodiment.

DETAILED DESCRIPTION

Figure 1:
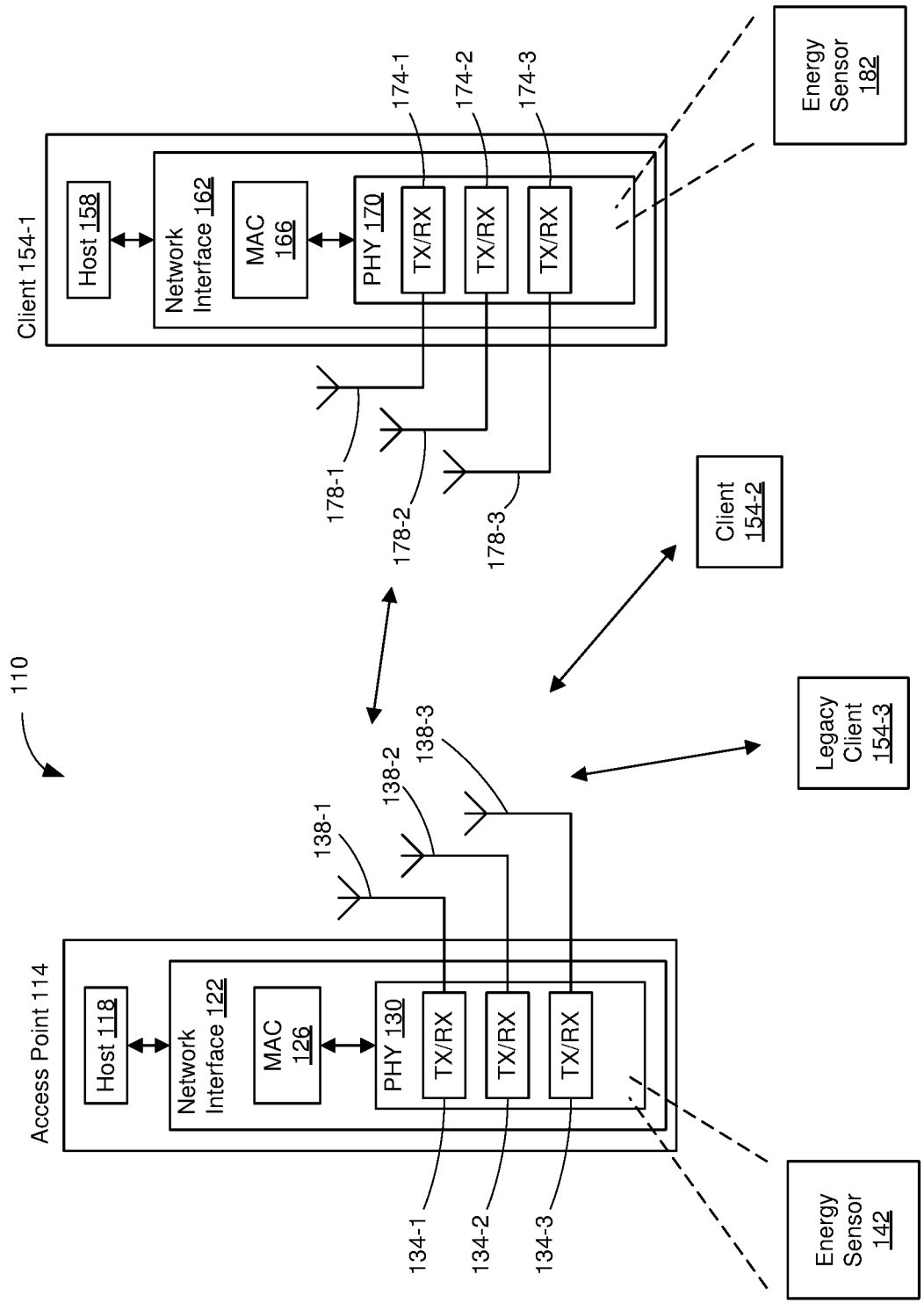
FIG. 1 is a block diagram of an example wireless local area network (WLAN) that uses a punctured operating channel in which one or more sub-channels within an overall bandwidth are not used, according to an embodiment.

The IEEE 802.11n Standard communication protocol, the IEEE 802.11ac Standard communication protocol, and the IEEE 802.11ax Standard communication protocol (now under development) permit an access point (AP) of a wireless local area network (WLAN) to establish an operating channel that comprises multiple 20 MHz communication sub-channels (sometimes referred to herein as "component channels") aggregated together to form a composite communication channel. For example, an access point (AP) may establish an operating channel by aggregating two adjacent 20 MHz sub-channels to form a 40 MHz composite channel; by aggregating four adjacent 20 MHz sub-channels to form an 80 MHz composite channel; or by aggregating eight adjacent 20 MHz sub-channels to form a 160 MHz composite channel.

In the IEEE 802.11n Standard communication protocol, only operating channels of 20 MHz and 40 MHz are permitted. In the IEEE 802.11ac Standard and the IEEE 802.11ax Standard communication protocols, only operating channels of 20 MHz, 40 MHz, 80 MHz, and 160 MHz are permitted.

Because only operating channels of certain bandwidths are permitted in the IEEE 802.11ac Standard and the IEEE 802.11ax Standard communication protocols, if one of the 20 MHz sub-channels of an operating channel becomes busy (e.g., due to use by a neighboring WLAN) and the AP determines that a smaller bandwidth operating channel is to be established, the AP must change the operating channel to a lower bandwidth operating channel that does not include the busy sub-channel. For example, the AP may change the operating channel from a 160 MHz composite channel to an 80 MHz composite channel; from an 80 MHz composite channel to a 40 MHz composite channel, or from a 40 MHz composite channel to one of the 20 MHz sub-channels. Because only operating channels of 20 MHz, 40 MHz, 80 MHz, and 160 MHz are permitted in the IEEE 802.11ac Standard and the IEEE 802.11ax Standard communication protocols, if one sub-channel in an 80 MHz operating channel becomes busy, the AP reduces the operating channel to 40 MHz, thus reducing the operating channel bandwidth by 40 MHz in response to one 20 MHz sub-channel being busy. Similarly, if one sub-channel in a 160 MHz operating channel becomes busy, the AP reduces the operating channel to 80 MHz, thus reducing the operating channel bandwidth by 80 MHz in response to one 20 MHz sub-channel being busy.

As the density of IEEE 802.11 WLANs increases over time, it tends to become more difficult for an AP to find several 20 MHz sub-channels that are idle and that can be aggregated together to form a larger composite channel. Additionally, since government regulatory authorities have permitted IEEE 802.11 WLANs to operate in radio frequency (RF) bands that are also used by other technologies (such as radar systems), this also tends to make it more difficult for an AP to find several 20 MHz sub-channels that are idle and can be aggregated together to form a larger composite channel.

In various embodiments described below, an AP can establish a "punctured" operating channel having an overall bandwidth defined by the AP and permitted by a wireless communication protocol, but in which one or more sub-channels within the overall bandwidth are not used; and the aggregate bandwidth of the punctured operating channel is larger than an overall bandwidth of a next smaller sized operating channel that is permitted by the wireless communication protocol. As an illustrative example, the AP can establish a punctured operating channel having an overall bandwidth defined by the AP to be 80 MHz, but in which one 20 MHz sub-channel within the overall 80 MHz bandwidth is not used, according to an embodiment. As another illustrative example, the AP can establish a punctured operating channel having an overall bandwidth defined by the AP to be 160 MHz, but in which up to three 20 MHz sub-channels within the overall 160 MHz bandwidth are not used, according to an embodiment. In the illustrative example above, if one (or two, or three) sub-channel within an overall 160 MHz composite channel is busy, the AP can establish a punctured operating channel having an aggregate bandwidth that is greater than 80 MHz. This is in contrast to prior art WiFi systems in which the AP would be required to switch to an operating channel of 80 MHz even if only one 20 MHz sub-channel within an overall 160 MHz composite channel became busy.

Various embodiments of methods for announcing a punctured operating channel are described below. Additionally, various embodiments of methods for negotiating a bandwidth within a punctured operating channel for a communication exchange are described below. Additionally, various embodiments of methods for choosing a transmission parameter(s) (e.g., a modulation and coding scheme (MCS), a number of spatial streams, etc.) to use when transmitting in a punctured operating channel are described below.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the network interface device 122 is configured for operating within a single RF band at a given time. In another embodiment, the network interface device 122 is configured for operating within multiple RF bands at the same time. For example, in an embodiment, the network interface device 122 includes multiple PHY processors 130 to facilitate multi-RF band communication, where respective PHY processors 130 correspond to respective RF bands. In another embodiment, the network interface device 122 includes a single PHY processor 130, where each transceiver 134 includes respective RF radios corresponding to respective RF bands to facilitate multi-band communication.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The PHY processor 130 includes one or more energy sensors 142 (sometimes referred to herein as "the energy sensor 142" for brevity) that are configured to measure energy levels in communication channels for the purpose of determining whether the communication channels are idle. The one or more energy sensors 142 include respective energy level sensors corresponding to respective communication channels, in an embodiment. The energy sensor 142 includes a single energy level sensor that is time-shared to measure energy levels of different communication channels, in another embodiment.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The PHY processor 170 includes one or more energy sensors 182 (sometimes referred to herein as "the energy sensor 182" for brevity) that are configured to measure energy levels in communication channels for the purpose of determining whether the communication channels are idle. The one or more energy sensors 182 include respective energy level sensors corresponding to respective communication channels, in an embodiment. The energy sensor 182 includes a single energy level sensor that is time-shared to measure energy levels of different communication channels, in another embodiment.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
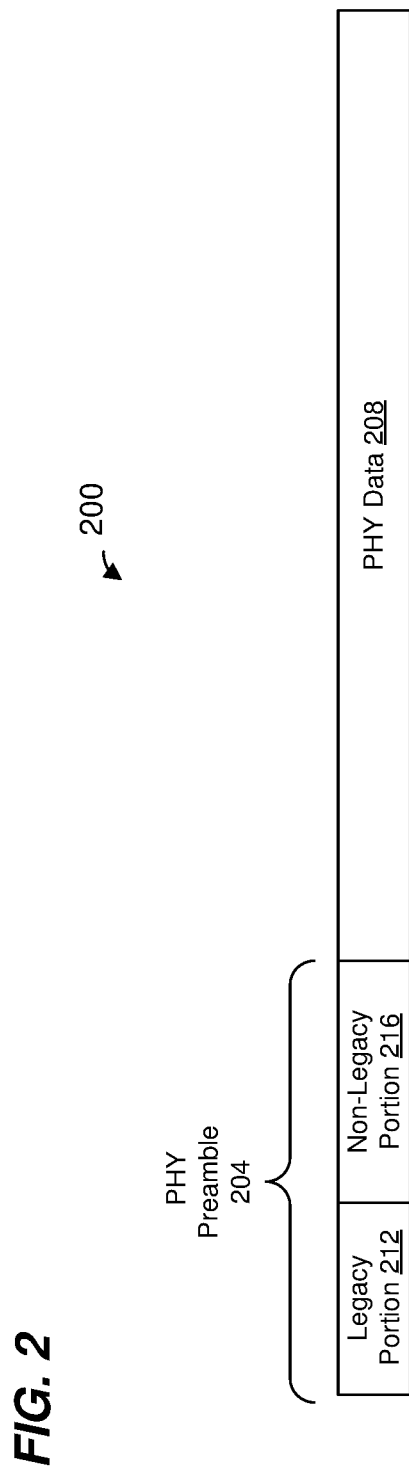
FIG. 2 is a block diagram of an example physical layer (PHY) data unit transmitted by communication devices in the WLAN of FIG. 1, according to an embodiment.

FIG. 2 is a diagram of an example PPDU 200 that the network interface device 122 (FIG. 1) is configured to generate and transmit to one or more client stations 154

(e.g., the client station 154-1), according to an embodiment. If the PPDU is transmitted by a client station 154, the network interface device 122 (FIG. 1) is also configured to receive and process the PPDU 200, according to an embodiment.

The network interface device 162 (FIG. 1) is also be configured to generate and transmit the PPDU 200 to the AP 114, according to an embodiment. If the PPDU is transmitted by the AP 114, the network interface device 162 (FIG. 1) is also configured to receive and process the PPDU 200, according to an embodiment.

The PPDU 200 may occupy a 20 MHz bandwidth or another suitable bandwidth. Data units similar to the PPDU 200 occupy other suitable bandwidths that correspond to an aggregation of multiple sub-channels (e.g., each having a 20 MHz bandwidth or another suitable bandwidth), in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200. The PHY data portion may include a single MPDU, or may include an aggregated MPDU (A-MPDU) comprising of a plurality of MPDUs.

In an embodiment, the PPDU 200 is a single-user (SU) PHY data unit transmitted by one of the client stations 154 to the AP 114, or transmitted by the AP 114 to one of the client station 154. In another embodiment, the PPDU 200 is a downlink multi-user (MU) PHY data unit in which the AP transmits independent data streams to multiple client stations 154 using respective sets of OFDM tones and/or spatial streams allocated to the client stations 154. In another embodiment, the PPDU 200 is an uplink MU PHY data unit in which the multiple client stations simultaneously transmit independent data streams to the AP 114 using respective sets of OFDM tones and/or spatial streams allocated to the client stations 154.

Figure 3A:
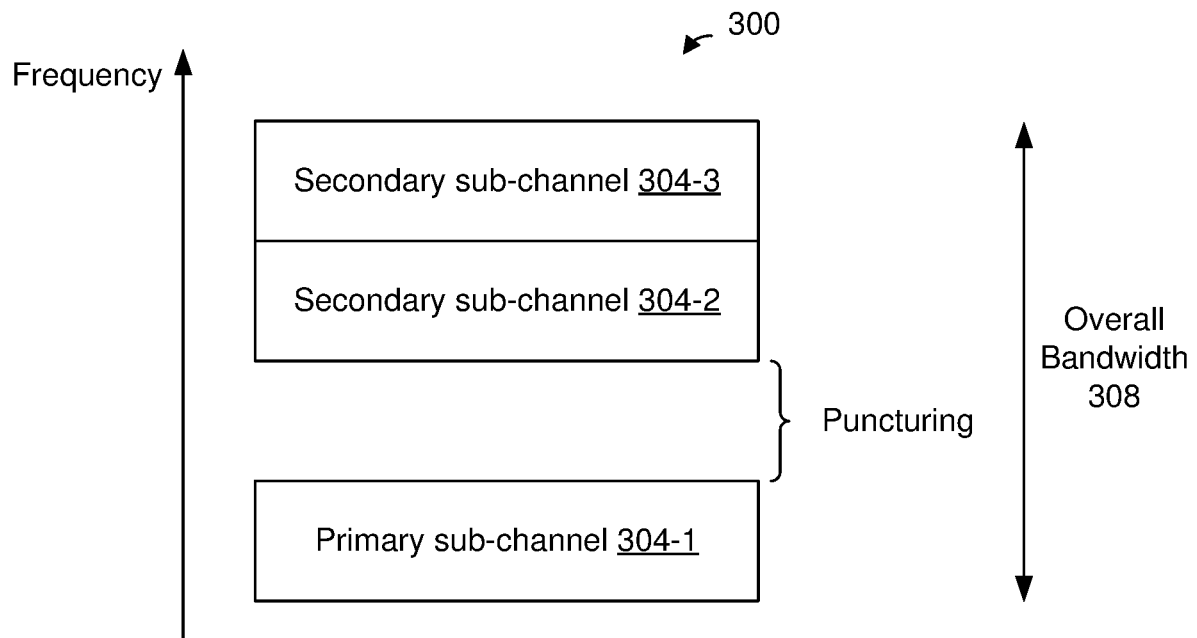
FIG. 3A is a diagram of an example punctured operating channel, according to an embodiment.

FIG. 3A is a diagram of an example punctured operating channel 300, according to an embodiment. The punctured operating channel 300 comprises a plurality of sub-channels 304 that span an overall bandwidth 308. Within the overall bandwidth 308, one of the sub-channels is "punctured", e.g., nothing is transmitted within one of the sub-channels. Although the example punctured operating channel 300 is illustrated as spanning an overall bandwidth corresponding to four sub-channels, other punctured operating channels span overall bandwidths corresponding to other suitable numbers of sub-channels such as eight, sixteen, twenty four, thirty two, etc., according to various embodiments. Although the example punctured operating channel 300 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments. For example, if the communication protocol defines operating channels of 80 MHz and 160 MHz, a punctured operating channel spanning an overall bandwidth of 160 MHz may have up to three punctured 20 MHz sub-channels, according to an embodiment.

In some embodiments, one sub-channel (e.g., sub-channel 304-1) within a composite channel is designated as a primary sub-channel, and other sub-channels (e.g., sub-channels 304-2 and 304-3) are designated as secondary sub-channels. In some embodiments, only secondary sub-channels can be punctured, i.e., the primary sub-channel cannot be punctured.

Figure 3B:
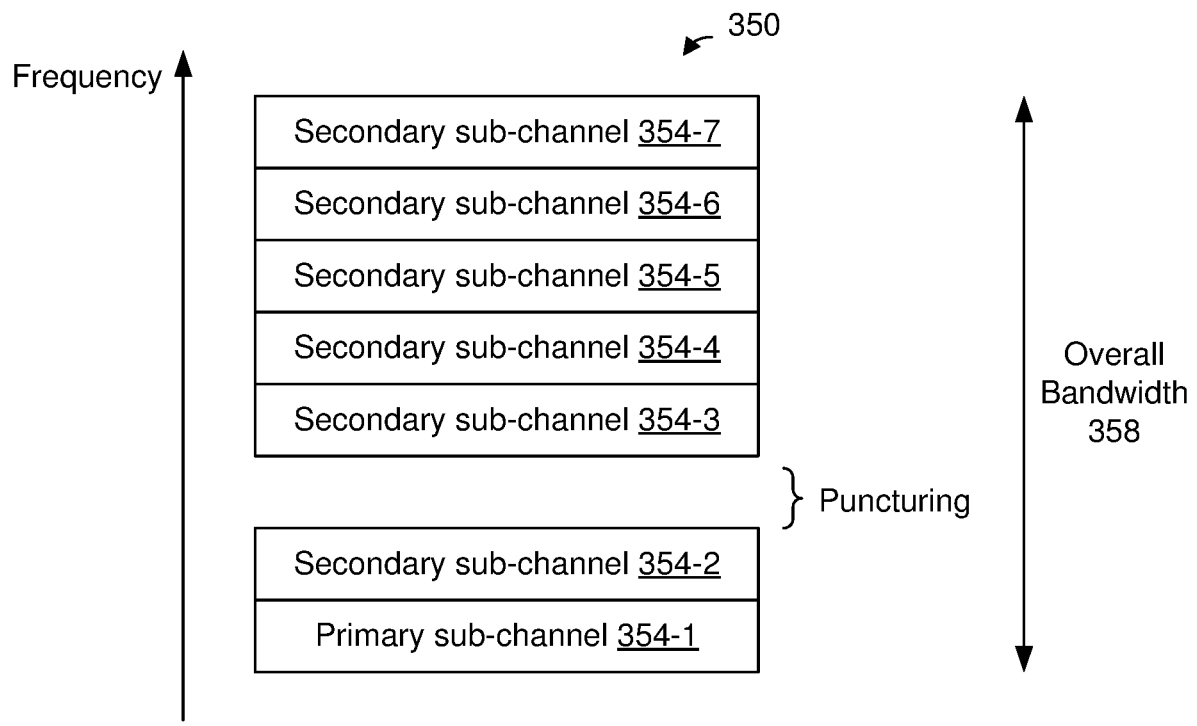
FIG. 3B is a diagram of another example punctured operating channel, according to another embodiment.

FIG. 3B is a diagram of another example punctured operating channel 350, according to an embodiment. The punctured operating channel 350 comprises a plurality of sub-channels 354 that span an overall bandwidth 358. Within the overall bandwidth 358, one of the sub-channels is "punctured", e.g., nothing is transmitted within one of the sub-channels. Although the example punctured operating channel 350 is illustrated as spanning an overall bandwidth corresponding to eight sub-channels, other punctured operating channels span overall bandwidths corresponding to other suitable numbers of sub-channels such as four, sixteen, twenty four, thirty two, etc., according to various embodiments. Although the example punctured operating channel 350 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments.

In some embodiments, one sub-channel (e.g., sub-channel 354-1) within a composite channel is designated as a primary sub-channel, and other sub-channels (e.g., sub-channels 354-2-354-7) are designated as secondary sub-channels. In some embodiments, only secondary sub-channels can be punctured, i.e., the primary sub-channel cannot be punctured.

Figure 3C:
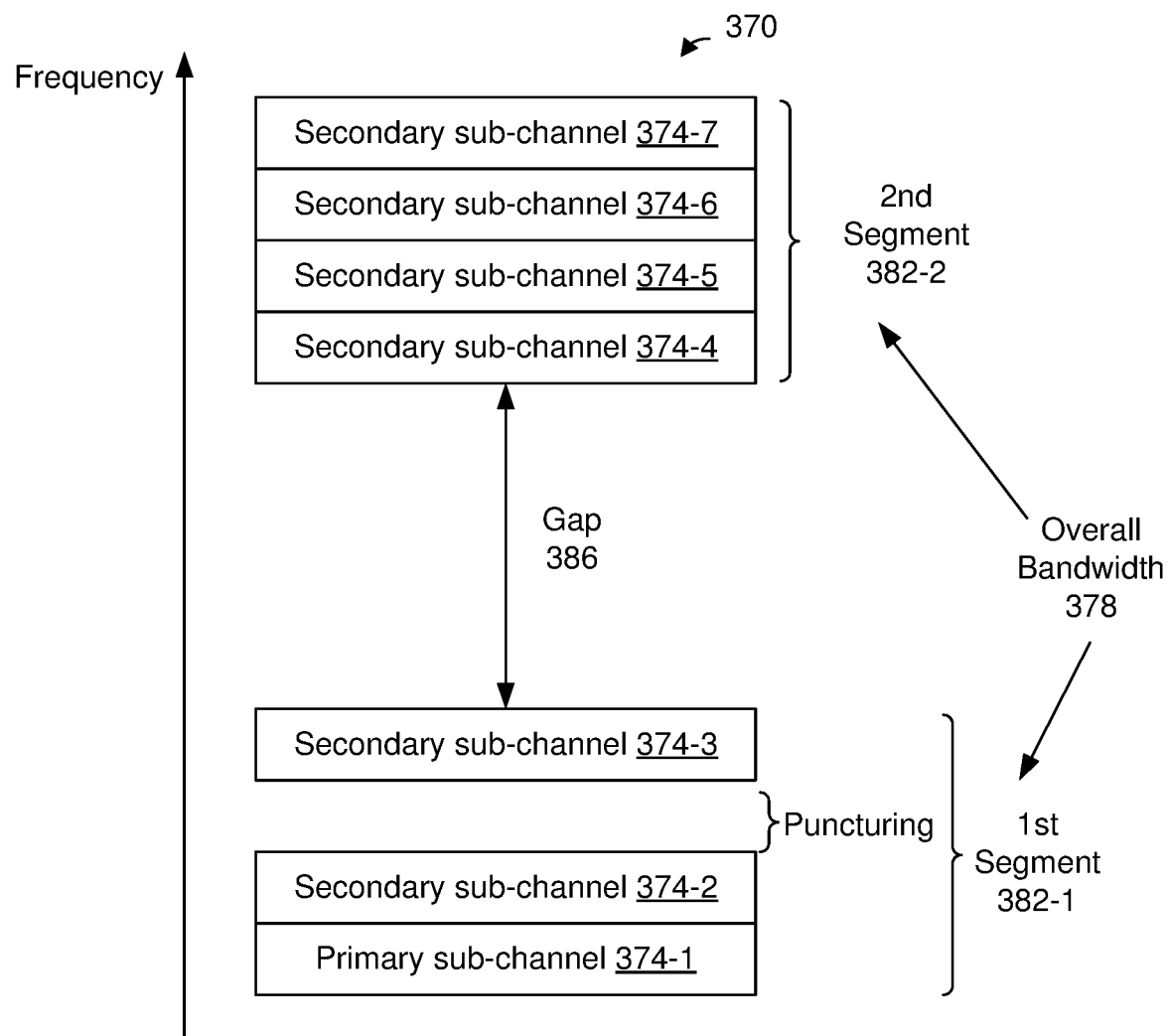
FIG. 3C is a diagram of another example punctured operating channel, according to another embodiment.

FIG. 3C is a diagram of another example punctured operating channel 370, according to an embodiment. The punctured operating channel 370 comprises a plurality of sub-channels 374 that span an overall bandwidth 378. The overall bandwidth 378 comprises two segments 382 separated by a gap in frequency 386. In an embodiment, the two segments 382 are within a same radio frequency (RF) band.

In another embodiment, the segments 382 are in different RF bands. The Federal Communication Commission (FCC) now permits wireless local area networks (WLANs) to operate in multiple RF bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Current IEEE 802.11 Standard protocols only permit a WLAN to operate in one RF band at a time. For example, the IEEE 802.11n Standard protocol is defined only for operation in the 2.4 GHz band, whereas the IEEE 802.11ac Standard protocol is defined only for operation in the 5 GHz band. The IEEE 802.11ax Standard protocol, now under development, will permit a WLAN to operate in the 2.4 GHz band or the 5 GHz band, but not both the 2.4 GHz band and the 5 GHz band at the same time.

A future WLAN protocol, now under development, may permit multi-band operation in which a WLAN can use spectrum in multiple RF bands at the same time. For example, the future WLAN protocol may permit aggregation of spectrum in a first RF band with spectrum in a second RF band to form a composite communication channel that can be used to transmit packets that span the composite communication channel.

Within the first segment 382-1, one of the sub-channels is "punctured", e.g., nothing is transmitted within one of the sub-channels. Although the example punctured operating channel 370 is illustrated as having one punctured sub-channel, other punctured operating channels include more than one punctured sub-channel depending on the overall bandwidth and such that the aggregate bandwidth of the punctured operating channel is larger than an overall bandwidth of a next smaller sized operating channel that is permitted by the wireless communication protocol, according to various embodiments.

Although the example punctured operating channel 370 is illustrated as having one punctured sub-channel in the first segment 382-1 of the overall bandwidth 378, the punctured operating channel 370 additionally or alternatively includes a punctured sub-channel in the second segment 382-2 of the overall bandwidth 378, in other embodiments.

Although the example punctured operating channel 370 is illustrated as spanning an overall bandwidth 378 corresponding to eight sub-channels, other punctured operating channels span overall bandwidths corresponding to other suitable numbers of sub-channels such as sixteen, twenty four, thirty two, etc., according to various embodiments. Although the segments 382 of the punctured operating channel 370 are illustrated as including a same number of sub-channels, the segments 382 of the punctured operating channel 370 included different numbers of sub-channels in other embodiments.

In some embodiments, one sub-channel (e.g., sub-channel 374-1) within a composite channel is designated as a primary sub-channel, and other sub-channels (e.g., sub-channels 374-2-374-7) are designated as secondary sub-channels. In some embodiments, only secondary sub-channels can be punctured, i.e., the primary sub-channel cannot be punctured.

Although the example punctured operating channel 370 is illustrated as including one primary sub-channel (e.g., sub-channel 374-1) in the first segment 382-1, another primary channel is also included in the second segment 382-2, in another embodiment. In some embodiments in which each segment 382 includes a respective primary sub-channel, only secondary sub-channels can be punctured, i.e., none of the primary sub-channels can be punctured.

Although the example punctured operating channel 370 is illustrated as including two segments 382 separated by the gap in frequency 386, other punctured operating channels include three or more segments, where each pair of adjacent segments is separated by a respective gap in frequency, according to other embodiments.

Although FIGS. 3A-C were described as punctured operating channels, in other embodiments, punctured channels such as described with reference to FIGS. 3A-C may be more temporarily established for a transmission opportunity period (TXOP) using a request-to-send (RTS), clear-to-send (CTS) exchange, according to an embodiment. For example, communication devices (e.g., the AP 114 and a client station 154) may determine that certain sub-channel(s) are busy using clear channel assessment procedures, and establish a punctured channel for a TXOP using an RTS/CTS exchange. In an embodiment, communication devices (e.g., the AP 114 and a client station 154) may determine that certain additional sub-channel(s) within an already punctured operating channel are busy using clear channel assessment procedures, and establish a punctured channel (with additional sub-channel(s) punctured) for a TXOP using an RTS/CTS exchange.

Figure 4A:
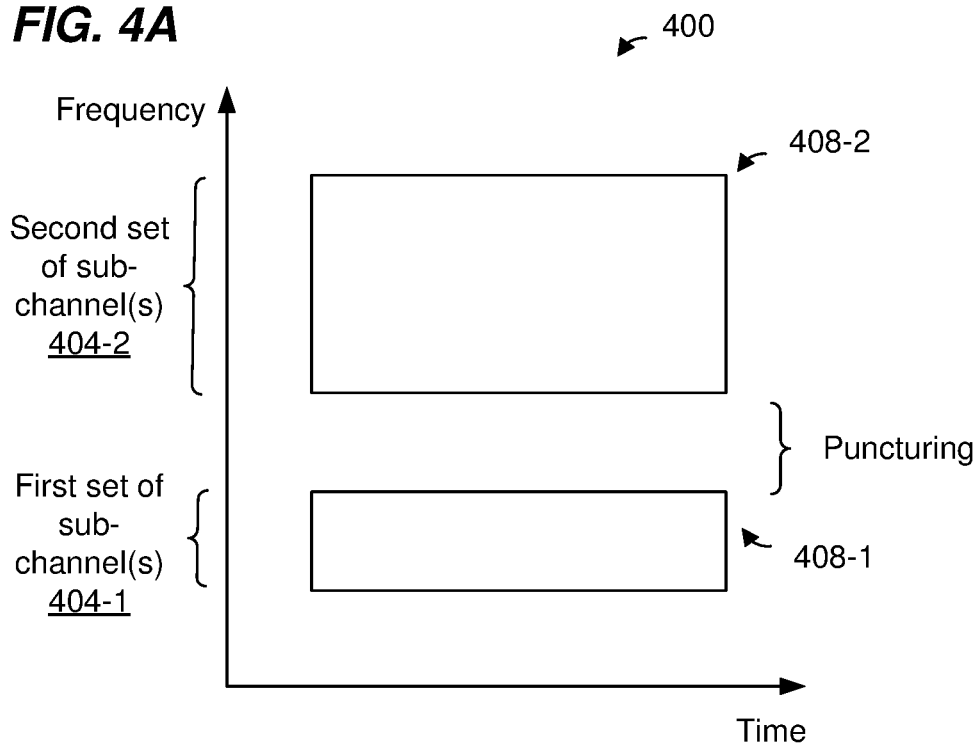
FIG. 4A is a diagram of an example transmission via a punctured operating channel, according to an embodiment.

FIG. 4A is a diagram of an example transmission 400 to or from a single client station via a punctured operating channel, according to an embodiment. The transmission 400 occurs via a punctured operating channel that includes a first set 404-1 of one or more sub-channels and a second set 404-2 of one or more sub-channels. The first set 404-1 of sub-channel(s) and the second set 404-2 of sub-channel(s) are separated in frequency by one or more punctured sub-channels.

The transmission 400 includes i) a first portion 408-1 transmitted via the first set 404-1 of sub-channel(s), and ii) a second portion 408-2 transmitted via the second set 404-2 of sub-channel(s). No signal is transmitted in the punctured sub-channel(s), or at least the transmit signal power in the punctured sub-channel(s) is suitably low (e.g., below −90 dBm, below −100 dBm, etc.) to avoid interfering with other WLAN networks or radar systems.

In some embodiments, the transmission 400 is a downlink (DL) single-user (SU) PPDU from the AP 114 to the client station 154-1. For example, the DL SU PPDU spans both the first set 404-1 of sub-channel(s) and the second set 404-2 of sub-channel(s). In some embodiments, the transmission 400 comprises a plurality of duplicated PPDUs respectively transmitted by the AP 114 to the client station 154-1 in each sub-channel in the first set 404-1 of sub-channel(s) and the second set 404-2 of sub-channel(s). In an embodiment, each duplicated PPDU has a PPDU format defined by a legacy wireless communication protocol (e.g., the IEEE 802.11a Standard protocol, the IEEE 802.11g Standard protocol, etc.).

In an embodiment, the transmission 400 is a DL SU PPDU that includes one or more data frames for the client station 154-1, and at least in some situations the client station 154-1 responds to the DL SU PPDU with an UL PPDU that includes acknowledgment information regarding the one or more data frames.

In an embodiment, the transmission 400 is a DL SU PPDU that includes one or more control frames (e.g., an acknowledgment (ACK) frame, a block acknowledgment (BA) frame, a trigger frame, etc.) for the client station 154-1. For example the AP 114 may transmit an ACK frame or a BA frame in response to an uplink (UL) PPDU from the client station 154-1. As another example, the AP 114 may transmit a trigger frame to the client station 154-1 to prompt the client station 154-1 to transmit an UL PPDU (e.g., a SU user trigger-based PPDU or an UL PPDU as part of a multi-user (MU) transmission (e.g., an orthogonal frequency division multiple access (OFDMA) transmission, an MU-multiple input, multiple output (MU-MIMO) transmission, etc.)).

In an embodiment, the transmission 400 is a DL MU PPDU that includes one or more frames for the client station 154-1 in both the first set 404-1 of sub-channel(s) and the second set 404-2 of sub-channel(s).

In other embodiments, the transmission 400 is an UL SU PPDU from the client station 154-1 to the AP 114. For example, the UL SU PPDU spans both the first set 404-1 of sub-channel(s) and the second set 404-2 of sub-channel(s). In some embodiments, the transmission 400 comprises a plurality of duplicated PPDUs respectively transmitted by the client station 154-1 to the AP 114 in each sub-channel in the first set 404-1 of sub-channel(s) and the second set 404-2 of sub-channel(s). In an embodiment, each duplicated PPDU has a PPDU format defined by a legacy wireless communication protocol (e.g., the IEEE 802.11a Standard protocol, the IEEE 802.11g Standard protocol, etc.).

In an embodiment, the transmission 400 is an UL SU PPDU that includes one or more data frames for the AP 114, and at least in some situations the AP 114 responds to the UL SU PPDU with a DL PPDU that includes acknowledgment information regarding the one or more data frames.

In an embodiment, the transmission 400 is an UL SU PPDU that includes one or more control frames (e.g., an ACK frame, a BA frame, etc.) for the AP 114. For example the client station 154-1 may transmit an ACK frame or a BA frame in response to a DL PPDU from the AP 114.

In an embodiment, the transmission 400 is an UL PPDU that is part of an UL MU transmission, and the transmission 400 includes one or more frames from the client station 154-1 in both the first set 404-1 of sub-channel(s) and the second set 404-2 of sub-channel(s).

Figure 4B:
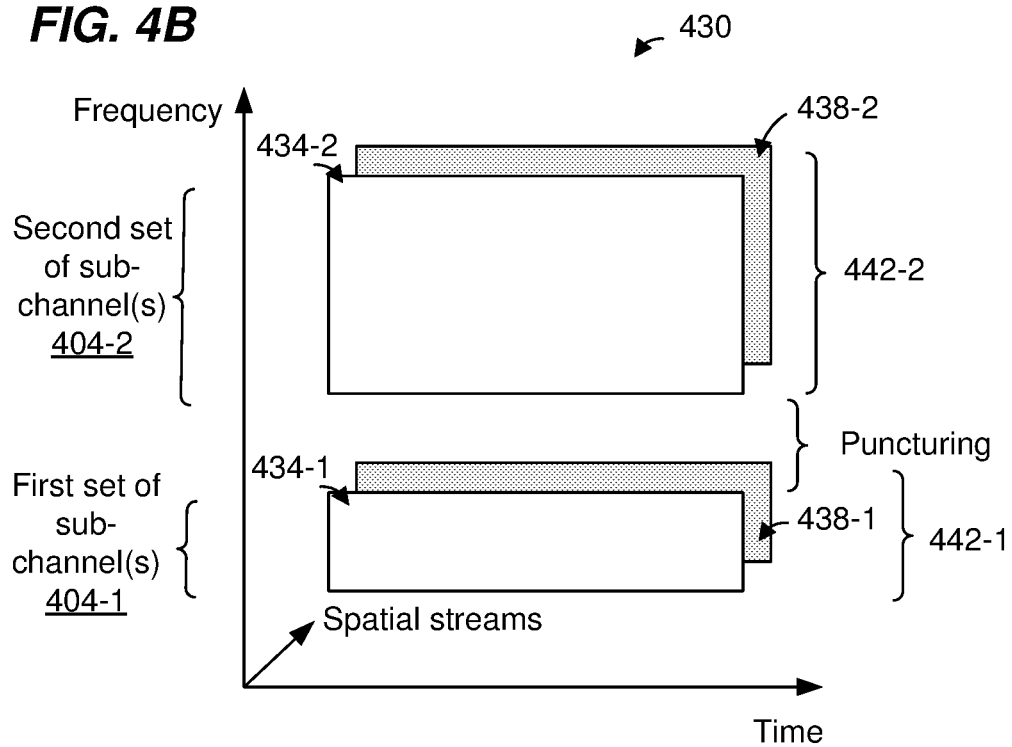
FIG. 4B is a diagram of another example transmission via a punctured operating channel, according to an embodiment.

FIG. 4B is a diagram of another example transmission 430 to or from a multiple client stations via the punctured operating channel of FIG. 4A, according to an embodiment. The transmission 430 is similar to the transmission 400 of FIG. 4A, but the transmission 430 is a MIMO transmission via multiple spatial streams. For example, a first portion 434 of the transmission 430 is transmitted to a first client station 154 via a first spatial stream, and a second portion 438 of the transmission 430 is transmitted to a second client station 154 via a second spatial stream.

The transmission 430 includes i) a first portion 442-1 transmitted via the first set 404-1 of sub-channel(s), and ii) a second portion 442-2 transmitted via the second set 404-2 of sub-channel(s). No signal is transmitted in the punctured sub-channel(s), or at least the transmit signal power in the punctured sub-channel(s) is suitably low (e.g., below −90 dBm, below −100 dBm, etc.) to avoid interfering with other WLAN networks or radar systems.

Figure 4C:
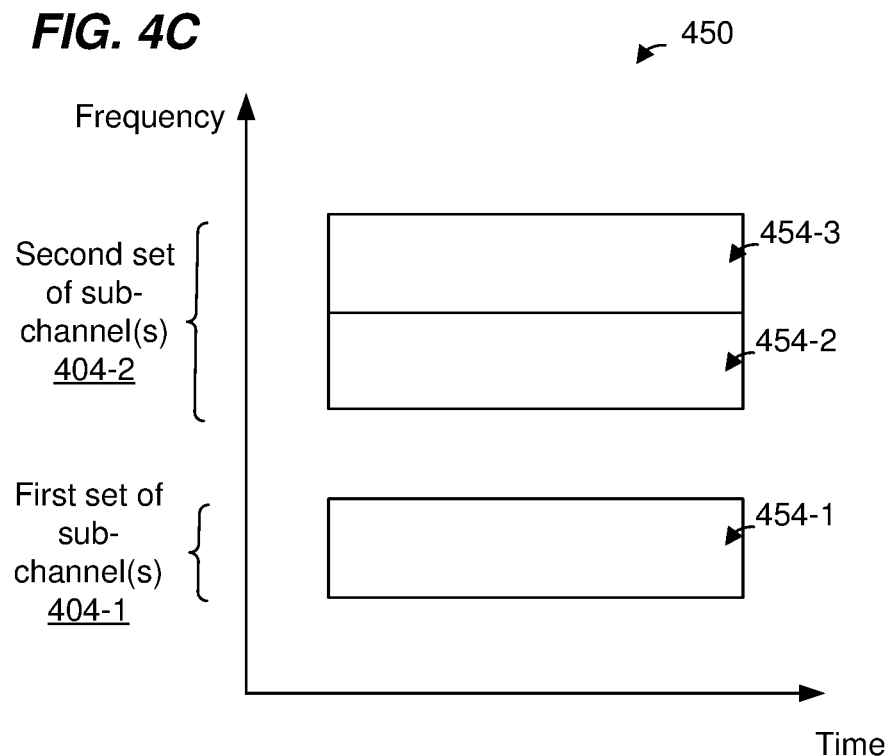
FIG. 4C is a diagram of another example transmission via a punctured operating channel, according to another embodiment.

FIG. 4C is a diagram of another example transmission 450 to or from a single client station via the punctured operating channel of FIG. 4A, according to an embodiment. The transmission 450 is a more specific example of the transmission 400 of FIG. 4A. In particular, the transmission 450 comprises a plurality of duplicated PPDUs 454 respectively transmitted in each sub-channel in the first set 404-1 of sub-channel(s) and the second set 404-2 of sub-channel(s). In an embodiment, each duplicated PPDU has a PPDU format defined by a legacy wireless communication protocol (e.g., the IEEE 802.11a Standard protocol, the IEEE 802.11g Standard protocol, etc.). In an embodiment, a cyclic shift in each 20 MHz channel of the punctured duplicated PPDU 454 is same as a cyclic shift that would be applied to each 20 MHz channel if a similar duplicated PPDU were transmitted in an operating channel of the same overall bandwidth but with no punctured sub-channels.

Referring again to FIG. 1, the AP 114 informs client stations 154 of the operating channel that is being used in the WLAN 110. For example, the AP 114 includes information that specifies the operating channel in MAC management frames such as beacon frames, probe response frames, association response frames, reassociation response frames, etc., for transmission to the client stations 154 to inform the client stations 154 of the operating channel, according to an embodiment.

Figure 5:
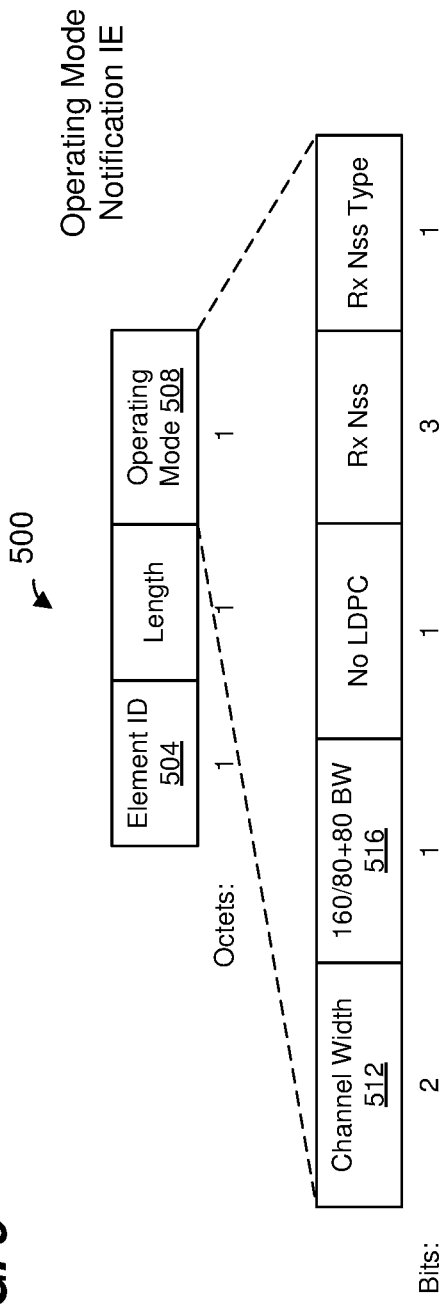
FIG. 5 is a diagram of an example information element (IE) for conveying operating mode information for a WLAN, according to an embodiment.

FIG. 5 is a diagram of an example information element (IE) 500 for conveying operating mode information for a WLAN, according to an embodiment. The IE 500 is sometimes referred to herein as an "operating mode notification IE," according to an embodiment. FIG. 5 indicates example lengths of various fields of the IE 500, according to an embodiment. In other embodiments, fields of the IE 500 have other suitable lengths. Additionally, in other embodiments, the IE 500 includes suitable fields other than those shown in FIG. 5, and/or omits one or more of the fields shown in FIG. 5.

The AP 114 (e.g., the MAC processor 130) includes the IE 500 in MAC management frames such as a beacon frame, a probe response frame, an association response frame, a reassociation response frame, etc., for transmission to other wireless communication devices (e.g., the client stations 154) to inform the other wireless communication devices of information regarding the operating channel being used in the WLAN 110, according to an embodiment. Upon receiving the IE 500, the client station 154-1 (e.g., the MAC processor 170) uses the information regarding the operating channel included in the IE 500 to determine parameters of the operating channel, such as an overall bandwidth of the operating channel, according to an embodiment.

The IE 500 includes an element identifier (ID) field 504 that indicates a format of the IE 500. For example, the element ID field 504 indicates that the IE 500 includes an operating mode field 508 having a particular format. For example, the element ID field 504 indicates that the IE 500 includes the operating mode field 508, and that the operating mode field 508 includes a plurality of sub-fields, including a subfield 512 that indicates an overall bandwidth of the operating channel. In an embodiment, the subfield 512 can be set to indicate one of four overall bandwidth options: i) 20 MHz, ii) 40 MHz, iii) 80 MHz, or iv) 160 MHz. In other embodiments, the subfield 512 can be set to indicate one or more other bandwidth options other than i) 20 MHz, ii) 40 MHz, iii) 80 MHz, or iv) 160 MHz.

Additionally, the operating mode field 508 includes a sub-field 516 that can be used to indicate, when the subfield 512 indicates a bandwidth of 160 MHz, whether the operating channel spans i) a contiguous 160 MHz bandwidth or ii) two 80 MHz frequency segments separated by a gap in frequency. In other embodiments with other bandwidth options, the sub-field 516 is used to indicate whether the operating channel is i) contiguous in frequency or ii) comprises multiple frequency segments separated by a gap in frequency.

In an embodiment, the IE 500 is formatted such that legacy devices that conform to the IEEE 802.11ac Standard (sometimes referred to herein as "11ac devices") are able to decode and process at least portions of the IE 500. For example, 11ac devices identify the format of the IE 500 using the element ID field 504, and process the subfield 512 to determine an overall bandwidth of the operating channel.

Figure 6:
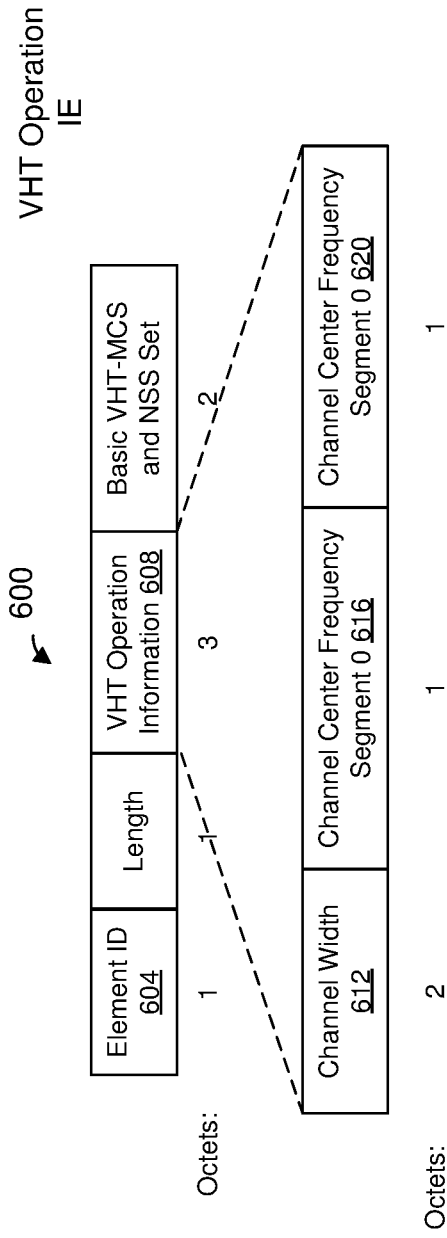
FIG. 6 is a diagram of another example IE for conveying operating mode information for a WLAN, according to another embodiment.

FIG. 6 is a diagram of another example IE 600 for conveying operating mode information for a WLAN, according to an embodiment. The IE 600 is sometimes referred to herein as a "VHT operation IE," where "VHT" stands for "very high throughput," according to an embodiment. FIG. 6 indicates example lengths of various fields of the IE 600, according to an embodiment. In other embodiments, fields of the IE 600 have other suitable lengths. Additionally, in other embodiments, the IE 600 includes suitable fields other than those shown in FIG. 6, and/or omits one or more of the fields shown in FIG. 6.

The AP 114 (e.g., the MAC processor 130) includes the IE 600 in MAC management frames such as a beacon frame, a probe response frame, an association response frame, a reassociation response frame, etc., for transmission to other wireless communication devices (e.g., the client stations 154) to inform the other wireless communication devices of information regarding the operating channel being used in the WLAN 110, according to an embodiment. Upon receiving the IE 600, the client station 154-1 (e.g., the MAC processor 170) uses the information regarding the operating channel included in the IE 600 to determine parameters of the operating channel, such as an overall bandwidth of the operating channel, according to an embodiment.

The IE 600 includes an element ID field 604 that indicates a format of the IE 600. For example, the element ID field 604 indicates that the IE 500 includes a plurality of fields, including a VHT operation information field 608 having a particular format. For example, the element ID field 604 indicates that the IE 600 includes the VHT operation information field 608, and that the VHT operation information field 608 includes a plurality of sub-fields, including a subfield 612 that indicates an overall bandwidth of the operating channel. In an embodiment, the subfield 612 can be set to indicate one of four overall bandwidth options: i) 20 MHz or 40 MHz, ii) 80 MHz, iii) 160 MHz (contiguous in frequency), or iv) 80+80 MHz (e.g., two 80 MHz segments separated by a gap in frequency). In other embodiments, the subfield 612 can be set to indicate one or more other bandwidth options other than i) 20 MHz or 40 MHz, ii) 80 MHz, iii) 160 MHz, or iv) 80+80 MHz.

In an embodiment, the VHT operation information field 608 includes one or more other subfields that indicate a location in frequency of the overall bandwidth, or if the bandwidth comprises multiple frequency segments, the locations in frequency of the frequency segments. For instance, the VHT operation information field 608 includes a subfield 616 that indicates a channel center frequency of an operating channel, at least in some situations, according to an embodiment. For example, when the subfield 612 indicates a bandwidth of 80 MHz or 160 MHz (contiguous in frequency), the subfield 616 indicates a channel center frequency for the 80 MHz or 160 MHz operating channel. When the subfield 612 indicates a bandwidth of 80+80 MHz (e.g., two 80 MHz segments separated by a gap in frequency), the subfield 616 indicates a channel center frequency for one of the 80 MHz segments (a first segment). In an embodiment, the VHT operation information field 608 includes a subfield 620. When the subfield 612 indicates a bandwidth of 80+80 MHz (e.g., two 80 MHz segments separated by a gap in frequency), the subfield 620 indicates a channel center frequency for another one of the 80 MHz segments (a second segment).

In an embodiment, the IE 600 is formatted such that 11ac devices are able to decode and process the IE 600. For example, 11ac devices identify the format of the IE 600 using the element ID field 604, and process the subfield 612 to determine an overall bandwidth of the operating channel. Additionally, 11ac devices process the subfield 616 and/or the subfield 620 to determine a particular location(s) in frequency of the operating channel.

Figure 7:
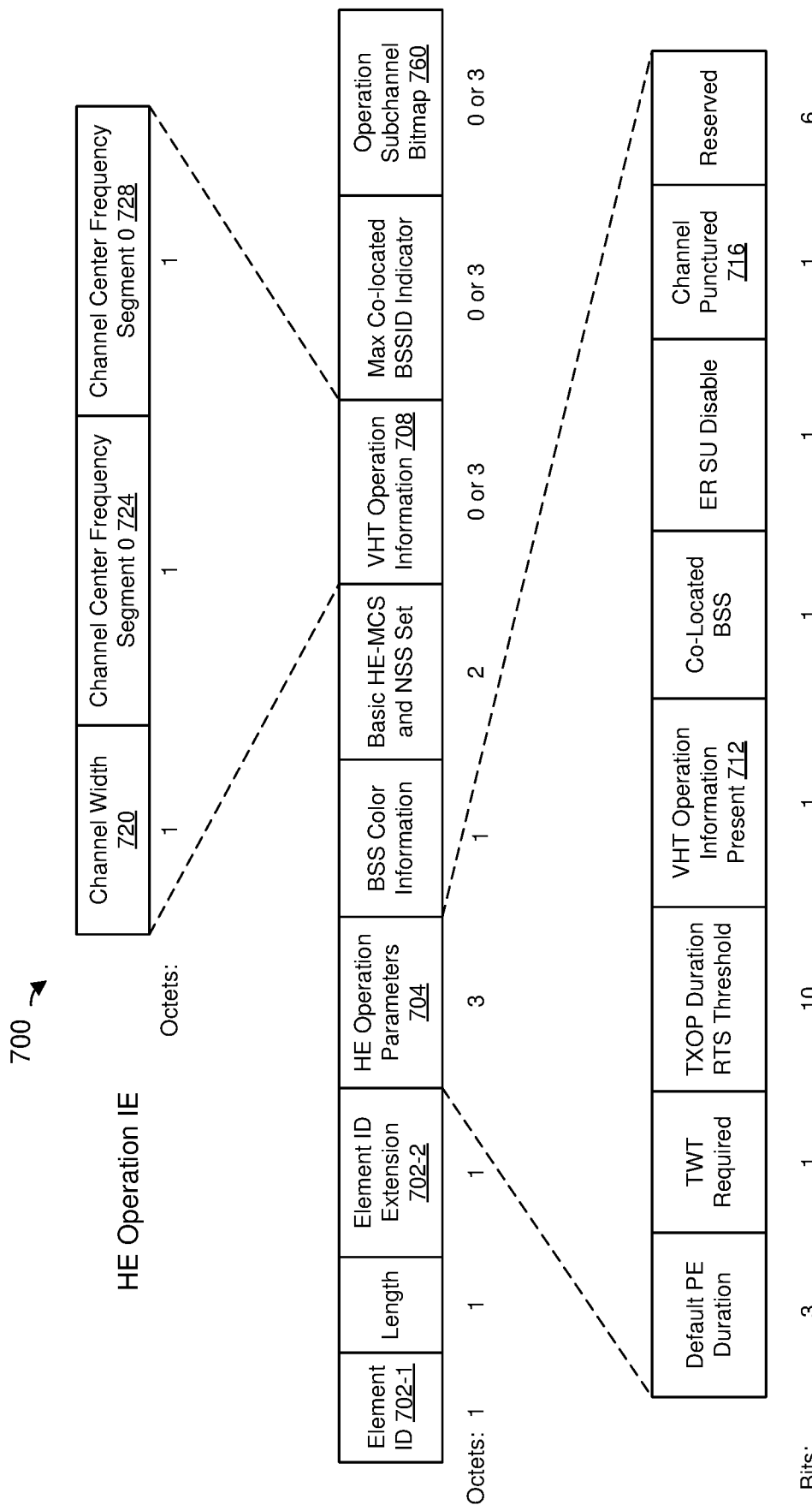
FIG. 7 is a diagram of another example IE for conveying operating mode information for a WLAN, according to another embodiment.

FIG. 7 is a diagram of another example IE 700 for conveying operating mode information for a WLAN, according to an embodiment. The IE 700 is sometimes referred to herein as an "HE operation IE," where "HE" stands for "high efficiency," according to an embodiment. FIG. 7 indicates example lengths of various fields of the IE 700, according to an embodiment. In other embodiments, fields of the IE 700 have other suitable lengths. Additionally, in other embodiments, the IE 700 includes suitable fields other than those shown in FIG. 7, and/or omits one or more of the fields shown in FIG. 7.

The AP 114 (e.g., the MAC processor 130) includes the IE 700 in MAC management frames such as a beacon frame, a probe response frame, an association response frame, a reassociation response frame, etc., for transmission to other wireless communication devices (e.g., the client stations 154) to inform the other wireless communication devices of information regarding the operating channel being used in the WLAN 110, according to an embodiment. Upon receiving the IE 700, the client station 154-1 (e.g., the MAC processor 170) uses the information regarding the operating channel included in the IE 700 to determine parameters of the operating channel, such as an overall bandwidth of the operating channel and which sub-channels within the overall bandwidth are punctured (if any), according to an embodiment.

The IE 700 includes an element ID field 702-1 and an element ID extension field 702-2 that together indicate a format of the IE 700. For example, the element ID field 702-1 and the element ID extension field 702-2 indicate that the IE 700 includes a plurality of fields, including a field 704 (sometimes referred to herein as an "HE operation parameters field") having a particular format, and selectively includes a field 708 (sometimes referred to herein as a "VHT operation information field") having a particular format. For example, the element ID field 702-1 and the element ID extension field 702-2 indicate that the IE 700 includes the HE operation parameters field 704, and that the HE operation parameters field 704 includes a plurality of sub-fields including a subfield 712 that indicates whether the IE 700 includes a VHT operation information field 708 and a subfield 716 that indicates whether any sub-channels in an operating channel are punctured. Additionally, the element ID field 702-1 and the element ID extension field 702-2 indicate that, if the VHT operation information field 708 is included in the IE 700, the VHT operation information field 708 includes a plurality of sub-fields including a subfield 720 that indicates an overall bandwidth of the operating channel. In an embodiment, the subfield 720 can be set to indicate one of four overall bandwidth options: i) 20 MHz or 40 MHz, ii) 80 MHz, iii) 160 MHz (contiguous in frequency), or iv) 80+80 MHz (e.g., two 80 MHz segments separated by a gap in frequency). In other embodiments, the subfield 720 can be set to indicate one or more other bandwidth options other than i) 20 MHz or 40 MHz, ii) 80 MHz, iii) 160 MHz, or iv) 80+80 MHz.

In an embodiment, the VHT operation information field 708 includes one or more other subfields that indicate a location in frequency of the overall bandwidth, or if the bandwidth comprises multiple frequency segments, the locations in frequency of the frequency segments. For instance, the VHT operation information field 708 includes a subfield 724 that indicates a channel center frequency of an operating channel, at least in some situations, according to an embodiment. For example, when the subfield 720 indicates a bandwidth of 80 MHz or 160 MHz (contiguous in frequency), the subfield 724 indicates a channel center frequency for the 80 MHz or 160 MHz operating channel. When the subfield 720 indicates a bandwidth of 80+80 MHz (e.g., two 80 MHz segments separated by a gap in frequency), the subfield 724 indicates a channel center frequency for one of the 80 MHz segments (a first segment). In an embodiment, the VHT operation information field 708 includes a subfield 724. When the subfield 720 indicates a bandwidth of 80+80 MHz (e.g., two 80 MHz segments separated by a gap in frequency), the subfield 728 indicates a channel center frequency for another one of the 80 MHz segments (a second segment).

In an embodiment, the IE 700 is formatted such that devices that conform to a WLAN protocol (such as the IEEE 802.11ax Standard protocol now under development, or a future protocol) are able to decode and process the IE 700. For example, devices conforming to the WLAN protocol identify the format of the IE 700 using the element ID field 702-1 and the element ID extension field 702-2, and process the fields 704 and 708 to determine i) an overall bandwidth of the operating channel and ii) whether any sub-channels are punctured. Additionally, 11ac devices process the subfield 724 and/or the subfield 728 to determine a particular location(s) in frequency of the operating channel.

The field 704 includes subfields indicating various operating parameters of the WLAN 110. For example, the field 704 includes the subfield 712 that indicates whether the IE 700 includes the VHT operation information field 708. The field 708 includes the subfield 720 that indicates the overall bandwidth of the operating channel. Additionally, the subfield 724 and/or the subfield 728 indicate particular location(s) in frequency of the operating channel.

The field 704 also includes the subfield 716 that indicates whether any sub-channels within the overall bandwidth of the operating channel are punctured. In an embodiment, when the subfield 716 indicates that one or more sub-channels within the overall bandwidth of the operating channel are punctured, the IE 700 includes a field 760 that indicates which sub-channels within the overall bandwidth of the operating channel are punctured. For example, the field 760 includes a bitmap that indicates which sub-channels within the overall bandwidth of the operating channel are punctured, according to an embodiment. In an embodiment in which the field 760 includes the bitmap, each bit in the bitmap corresponds to a sub-channel and each bit indicates whether the corresponding sub-channel is punctured. In an embodiment, when the subfield 716 indicates that no sub-channels within the overall bandwidth of the operating channel are punctured, the IE 700 omits the field 760.

In another embodiment, the subfield 716 is omitted, and the IE 700 always includes the field 760. In such an embodiment, when no sub-channels within the overall bandwidth of the operating channel are punctured, the field 760 is set to indicate that no sub-channels within the overall bandwidth of the operating channel are punctured.

In an embodiment, legacy devices (e.g., device that conform to the IEEE 802.11ac Standard or a previous version of the IEEE 802.11 Standard) are not able to decode and process the IE 700.

In an embodiment, the network interface device 122 generates (e.g., the MAC processor 130 generates) MAC management frames that include the IE 700, and the network interface device 122 transmits the MAC management frames in PPDUs to inform other wireless communication devices (e.g., the client stations 154) of the punctured operating channel. In an embodiment, the network interface device 122 generates (e.g., the MAC processor 130 generates) the MAC management frames to also include the IE 600 (the VHT operation IE), and the network interface device 122 transmits which informs legacy devices (e.g., 11ac devices) of an overall bandwidth of an operating channel.

Referring now to FIGS. 6 and 7, because legacy devices (e.g., 11ac devices) are not configured to use punctured operating channels, the AP 114 transmits MAC management frames having both the IE 700 and the IE 600 (the VHT operation IE), where the IE 600 (the VHT operation IE) indicates a smaller overall bandwidth as compared to the overall bandwidth indicated by the IE 700, and where the smaller overall bandwidth indicated by the IE 600 (the VHT operation IE) does not include the punctured sub-channels, according to an embodiment. For example, the subfield 612 in the IE 600 (the VHT operation IE) is set to a maximal contiguous bandwidth permitted by the IEEE 802.11ac Standard that i) includes the primary sub-channel of the punctured operating channel, and ii) does not include any punctured sub-channels; whereas the field 720 in the IE 700 (the HE operation IE) is set to the overall bandwidth of the operating channel, including both sub-channels that are operational and punctured sub-channels, according to an embodiment.

Referring now to FIGS. 5, 6, and 7, when the AP 114 transmits a MAC management frame having the IE 600 (the VHT operation IE), the IE 600 (the VHT operation IE) indicates a smaller overall bandwidth as compared to the overall bandwidth of the punctured operating channel, where the smaller overall bandwidth indicated by the IE 600 (the VHT operation IE) does not include the punctured sub-channels; additionally, when the MAC management frame includes both the IE 600 (the VHT operation IE) and the IE 700 (the HE operation IE), the IE 700 does not include the VHT operating information field 708, according to an embodiment. Conversely, when the AP 114 transmits a MAC management frame having the IE 700 (the HE operation IE) and the IE 700 includes the VHT operating information field 708, the MAC management frame does not include the IE 600 (the VHT operation IE), according to an embodiment. Additionally, when the AP 114 transmits a MAC management frame having the IE 700 (the HE operation IE) and the IE 700 includes the VHT operating information field 708, the subfield 720 in the IE 700 (the HE operation IE) is set to the overall bandwidth of the punctured operating channel, according to an embodiment. Additionally, the IE 500 is always included in a beacon frame, a probe response frame, an association response frame, a reassociation response frame, and the channel width subfield 512 indicates the smaller overall bandwidth that does not include the punctured sub-channels. For example, the field 512 in the IE 500 is set to a maximal contiguous bandwidth permitted by the IEEE 802.11ac Standard that i) includes the primary sub-channel of the punctured operating channel, and ii) does not include any punctured sub-channels, according to an embodiment.

In an embodiment, when the WLAN 110 does not include any legacy stations, the AP 114 transmits a MAC management frame having the IE 700 (the HE operation IE) and the IE 700 includes the VHT operating information field 708, and the MAC management frame does not include the IE 600 (the VHT operation IE), according to an embodiment. Additionally, the subfield 720 in the VHT operating information field 708 is set to the overall bandwidth of the operating channel, including both sub-channels that are operational and punctured sub-channels, according to an embodiment. Additionally, when devices in the WLAN 110 send PPDUs that conform to the IEEE 802.11ac Standard (sometimes referred to herein as "VHT PPDUs"), the bandwidth of the VHT PPDUs the maximal contiguous bandwidth permitted by the IEEE 802.11ac Standard that i) includes the primary sub-channel of the punctured operating channel, and ii) does not include any punctured sub-channels.

Figure 8:
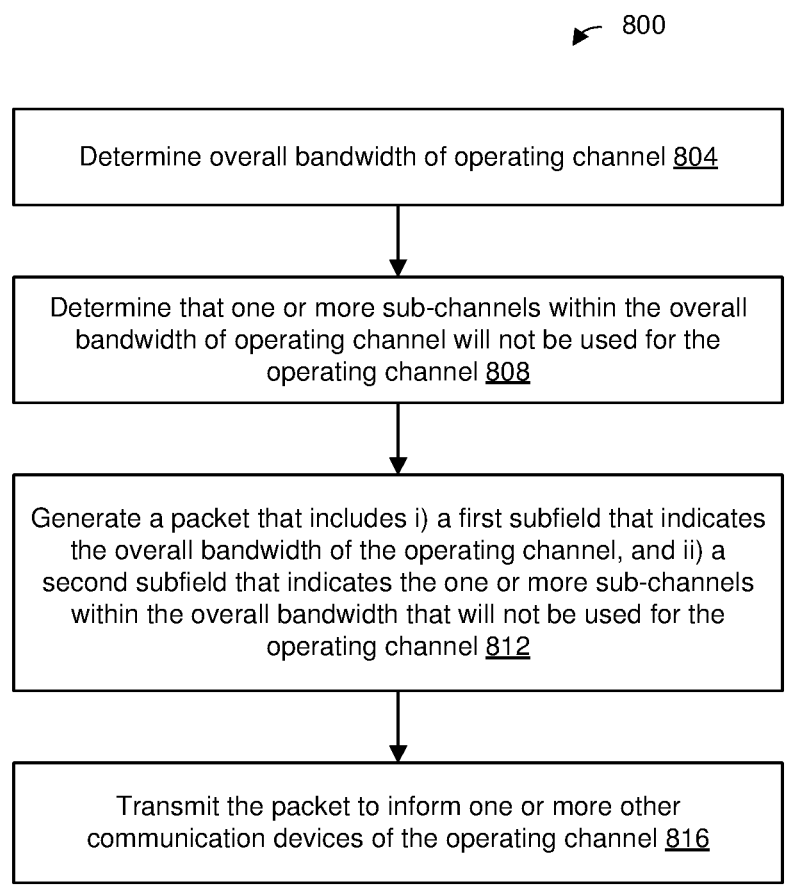
FIG. 8 is a flow diagram of an example method for establishing an operating channel for a WLAN, according to an embodiment.

FIG. 8 is a flow diagram of an example method 800 for establishing an operating channel for a WLAN, according to an embodiment. In some embodiments, the AP 114 of FIG. 1 is configured to implement the method 800. The method 800 is described, however, in the context of the AP 114 merely for explanatory purposes and, in other embodiments, the method 800 is implemented by another suitable device such as the client station 154-1 or another suitable wireless communication device.

At block 804, the AP 114 determines (e.g., the network interface device 122 determines, the MAC processor 126 determines, etc.) an overall bandwidth of an operating channel. In an embodiment, the overall bandwidth spans a plurality of sub-channels.

At block 808, the AP 114 determines (e.g., the network interface device 122 determines, the MAC processor 126 determines, etc.) that one or more sub-channels within the overall bandwidth will not be used for the operating channel.

At block 812, the AP 114 generates (e.g., the network interface device 122 generates) a packet that includes i) a first subfield that indicates the overall bandwidth of the operating channel, and ii) a second subfield that indicates the one or more sub-channels within the overall bandwidth that will not be used for the operating channel.

In an embodiment generating the packet at block 812 comprises: the AP 114 generating (e.g., the network interface device 122 generating, the MAC processor 126 generating, etc.) a MAC management frame that includes i) the first subfield that indicates the overall bandwidth of the operating channel, and ii) the second subfield that indicates the one or more sub-channels within the overall bandwidth that will not be used for the operating channel; and the AP 114 generating (e.g., the network interface device 122 generating, the PHY processor 130 generating, etc.) the packet to include the MAC management frame. In an embodiment, the MAC management frame comprises one of: i) a beacon frame, ii) a probe response frame, iii) an association response frame, or iv) a reassociation response frame.

At block 816, the AP 114 transmits (e.g., the network interface device 122 transmits) the packet to inform one or more other communication devices in the WLAN of the operating channel for the WLAN. In an embodiment, transmitting the packet informs the one or more other communication devices that the operating channel is to be used until the AP 114 specifies a change to the operating channel.

The one or more other communication devices are one or more client stations 154 that are configured to operate according to a first communication protocol ("first protocol devices"), and the operating channel is a first operating channel to be used by the one or more first protocol devices, according to an embodiment. In an embodiment, the method 800 further comprises: the AP 114 determining (e.g., the network interface device 122 determining, the MAC processor 126 determining, etc.) a bandwidth of a second operating channel that is permitted by a second legacy communication protocol and that is to be used by one or more legacy client stations 154 in the WLAN that operate according to the second legacy communication protocol. The bandwidth of the second operating channel is i) contiguous in frequency, ii) within the overall bandwidth of the first operating channel, and iii) does not span any of the one or more sub-channels that will not be used for the first operating channel, according to an embodiment.

In an embodiment, generating the packet at block 812 includes generating the packet to include i) a third subfield that indicates the bandwidth of the second operating channel; and transmitting the packet at block 816 also informs the one or more legacy client stations 154 in the WLAN of the second operating channel for the WLAN.

In another embodiment, the method 800 further includes: the AP 114 generating (e.g., the network interface device 122 generating, etc.) a second packet that includes a third subfield that indicates the bandwidth of the second operating channel; and the AP 114 transmitting (e.g., the network interface device 122 transmitting, etc.) the second packet to inform the one or more legacy client stations 154 in the WLAN of the second operating channel for the WLAN.

In an embodiment, the AP 114 may need to change the operating channel after having established the operating channel using techniques such as described above with reference to FIGS. 5-8. In some embodiments, to inform 11ac devices of a new operating channel bandwidth, the AP 114 transmits a packet having a MAC management frame with a subfield that indicates a new bandwidth of the operating channel, where the MAC management frame is formatted according to the IEEE 802.11ac Standard. Similarly, two communication devices in the WLAN may negotiate to perform an exchange of packets using a smaller bandwidth within the operating channel. In some embodiments, the negotiation involves transmission of a packet having a MAC management frame with the subfield that indicates a new bandwidth within the operating channel to be used for the communication exchange, where the MAC management frame is formatted according to the IEEE 802.11ac Standard.

FIG. 9 is a diagram of an example field 900 for conveying operating mode change information for a WLAN, according to an embodiment. The field 900 is sometimes referred to herein as a "VHT operating mode field," according to an embodiment. FIG. 9 indicates example lengths of various subfields of the field 900, according to an embodiment. In other embodiments, subfields of the field 900 have other suitable lengths. Additionally, in other embodiments, the field 900 includes suitable subfields other than those shown in FIG. 9, and/or omits one or more of the subfields shown in FIG. 9.

The AP 114 (e.g., the MAC processor 130) includes the field 900 in a MAC management frame such as a VHT operating mode notification frame (or another suitable MAC management frame), for transmission to other wireless communication devices (e.g., the client stations 154) to inform the other wireless communication devices of a change regarding the operating channel being used in the WLAN 110, according to an embodiment. Upon receiving the field 900, the client station 154-1 (e.g., the MAC processor 170) uses the information regarding the change in the operating channel included in the field 900 to determine parameters of the operating channel, such as an overall bandwidth of the operating channel, according to an embodiment. The field 900 includes a subfield 904 that indicates a new overall bandwidth of the operating channel (or a new bandwidth to be used for a subsequent communication exchange).

In another embodiment, the client station 154-1 (e.g., the MAC processor 170) includes the field 900 in a MAC management frame such as a VHT operating mode notification frame (or another suitable MAC management frame), for transmission to another wireless communication device (e.g., the AP 114) to inform the other wireless communication device of a smaller bandwidth within the operating channel to be used for a subsequent communication exchange, according to an embodiment. Upon receiving the field 900, the other communication device (e.g., the MAC processor 130 of the AP 114) uses the information regarding the change in the operating channel included in the field 900 to determine parameters of the smaller bandwidth to be used in the subsequent communication exchange.

In an embodiment, the field 900 (and the packet in which the field 900 is included) is formatted such that 11ac devices are able to decode and process the field 900. For example, 11ac devices process the field 900 to determine a new overall bandwidth of the operating channel.

In an embodiment, the field 900 is used for indicating operating mode changes only for VHT PPDUs. In an embodiment, the bandwidth indicated by the subfield 904 must be less than or equal to the bandwidth previously indicated by the subfield 612 in the VHT operation IE 600 (FIG. 6).

In an embodiment in which only the HE operation IE 700 is broadcasted in the WLAN (e.g., the WLAN does not include any legacy devices), the field 900 is used for indicating operating mode changes for both i) VHT PPDUs, and ii) PPDUs that conform to a more recent IEEE 802.11 Standard (e.g., the IEEE 802.11ax Standard now under development). In an embodiment, the bandwidth indicated by the subfield 904 must be less than or equal to the bandwidth previously indicated by the subfield 720 in the HE operation IE 700 (FIG. 7). Subsequently, when devices in the WLAN 110 send VHT PPDUs, the bandwidth of the VHT PPDUs cannot be more than i) the bandwidth indicated by the subfield 904 or the maximal contiguous bandwidth permitted by the IEEE 802.11ac Standard that a) includes the primary sub-channel of the punctured operating channel, and b) does not include any punctured sub-channels. Additionally, when devices in the WLAN 110 send PPDUs that conform to the more recent IEEE 802.11 Standard (e.g., the IEEE 802.11ax Standard now under development), the bandwidth of such PPDUs cannot span more than i) the bandwidth indicated by the subfield 904 and ii) cannot include any punctured sub-channels previously indicated by the subfield 760 of the HE operation IE 700 (FIG. 7).

In an embodiment in the field 900 is transmitted to another device for indicating a bandwidth for a subsequent communication exchange, the field 900 is used for indicating operating mode changes for both i) VHT PPDUs, and ii) PPDUs that conform to the more recent IEEE 802.11 Standard (e.g., the IEEE 802.11ax Standard now under development). In an embodiment, the bandwidth indicated by the subfield 904 must be less than or equal to the bandwidth previously indicated by the subfield 720 in the HE operation IE 700 (FIG. 7). Subsequently, when VHT PPDUs are transmitted in the subsequent communication exchange, the bandwidth of the VHT PPDUs cannot be more than i) the bandwidth indicated by the subfield 904 or the maximal contiguous bandwidth permitted by the IEEE 802.11ac Standard that a) includes the primary sub-channel of the punctured operating channel, and b) does not include any punctured sub-channels. Additionally, when PPDUs that conform to the more recent IEEE 802.11 Standard (e.g., the IEEE 802.11ax Standard now under development) are transmitted in the subsequent communication exchange, the bandwidth of such PPDUs cannot span more than i) the bandwidth indicated by the subfield 904 and ii) cannot include any punctured sub-channels previously indicated by the subfield 760 of the HE operation IE 700 (FIG. 7).

FIG. 10 is a diagram of another example field 1000 for conveying operating mode change information for a WLAN, according to an embodiment. The field 1000 is sometimes referred to herein as an "operating mode control information field" or "OM control information field," according to an embodiment. FIG. 10 indicates example lengths of various subfields of the field 1000, according to an embodiment. In other embodiments, subfields of the field 1000 have other suitable lengths. Additionally, in other embodiments, the field 1000 includes suitable subfields other than those shown in FIG. 10, and/or omits one or more of the subfields shown in FIG. 10.

The AP 114 (e.g., the MAC processor 130) includes the field 1000 in a MAC management frame or a data frame for transmission to other wireless communication devices (e.g., the client stations 154) to inform the other wireless communication devices of a change regarding the operating channel being used in the WLAN 110, according to an embodiment. Upon receiving the field 1000, the client station 154-1 (e.g., the MAC processor 170) uses the information regarding the change in the operating channel included in the field 1000 to determine parameters of the operating channel, such as an overall bandwidth of the operating channel, according to an embodiment. The field 1000 includes a subfield 1004 that indicates a new overall bandwidth of the operating channel (or a new bandwidth to be used for a subsequent communication exchange).

In another embodiment, the client station 154-1 (e.g., the MAC processor 170) includes the field 1000 in a MAC management frame such as a VHT operating mode notification frame (or another suitable MAC management frame), for transmission to another wireless communication device (e.g., the AP 114) to inform the other wireless communication device of a smaller bandwidth within the operating channel to be used for a subsequent communication exchange, according to an embodiment. Upon receiving the field 1000, the other communication device (e.g., the MAC processor 130 of the AP 114) uses the information regarding the change in the operating channel included in the field 900 to determine parameters of the smaller bandwidth to be used in the subsequent communication exchange.

In an embodiment, the field 1000 (and the packet in which the field 1000 is included) is formatted such that devices that conform to a more recent IEEE 802.11 Standard (e.g., the IEEE 802.11ax Standard now under development) are able to decode and process the field 1000.

In an embodiment, the field 1000 is used for indicating operating mode changes only for PPDUs that conform to the more recent IEEE 802.11 Standard (e.g., the IEEE 802.11ax Standard now under development). In an embodiment, the bandwidth indicated by the subfield 1004 must be less than or equal to the bandwidth previously indicated by the subfield 720 in the HE operation IE 700 (FIG. 7).

In another embodiment, the field 1000 is used for indicating operating mode changes for both i) VHT PPDUs, and ii) PPDUs that conform to the more recent IEEE 802.11 Standard (e.g., the IEEE 802.11ax Standard now under development). In an embodiment, the bandwidth indicated by the subfield 1004 must be less than or equal to the bandwidth previously indicated by the subfield 720 in the HE operation IE 700 (FIG. 7). Subsequently, when devices in the WLAN 110 send VHT PPDUs, the bandwidth of the VHT PPDUs cannot be more than i) the bandwidth indicated by the subfield 1004 or the maximal contiguous bandwidth permitted by the IEEE 802.11ac Standard that a) includes the primary sub-channel of the punctured operating channel, and b) does not include any punctured sub-channels. Additionally, when devices in the WLAN 110 send PPDUs that conform to the more recent IEEE 802.11 Standard (e.g., the IEEE 802.11ax Standard now under development), the bandwidth of such PPDUs cannot span more than i) the bandwidth indicated by the subfield 1004 and ii) cannot include any punctured sub-channels previously indicated by the subfield 760 of the HE operation IE 700 (FIG. 7).

In an embodiment in the field 1000 is transmitted to another device for indicating a bandwidth for a subsequent communication exchange, the field 1000 is used for indicating operating mode changes for both i) VHT PPDUs, and ii) PPDUs that conform to the more recent IEEE 802.11

Standard (e.g., the IEEE 802.11ax Standard now under development). In an embodiment, the bandwidth indicated by the subfield 1004 must be less than or equal to the bandwidth previously indicated by the subfield 720 in the HE operation IE 700 (FIG. 7). Subsequently, when VHT PPDUs are transmitted in the subsequent communication exchange, the bandwidth of the VHT PPDUs cannot be more than i) the bandwidth indicated by the subfield 1004 or the maximal contiguous bandwidth permitted by the IEEE 802.11ac Standard that a) includes the primary sub-channel of the punctured operating channel, and b) does not include any punctured sub-channels. Additionally, when PPDUs that conform to the more recent IEEE 802.11 Standard (e.g., the IEEE 802.11ax Standard now under development) are transmitted in the subsequent communication exchange, the bandwidth of such PPDUs cannot span more than i) the bandwidth indicated by the subfield 1004 and ii) cannot include any punctured sub-channels previously indicated by the subfield 760 of the HE operation IE 700 (FIG. 7).

Referring again to FIG. 1, communication devices in the WLAN 110 exchange capability information reporting the capabilities of each communication device with regard to communication parameters such as supported frequency bandwidths, supported modulation and coding schemes (MCSs), supported numbers of spatial streams, etc. FIG. 11A is a diagram of an example IE 1100 for reporting capability information to other communication devices in the WLAN 110, according to an embodiment. The IE 1100 is sometimes referred to herein as an "HE capabilities IE," according to an embodiment. FIG. 11A indicates example lengths of various fields of the IE 1100, according to an embodiment. In other embodiments, fields of the IE 1100 have other suitable lengths. Additionally, in other embodiments, the IE 1100 includes suitable fields other than those shown in FIG. 11A, and/or omits one or more of the fields shown in FIG. 11A.

The AP 114 (e.g., the MAC processor 130) includes the IE 1100 in MAC management frames such as a beacon frame, a probe response frame, an association response frame, a reassociation response frame, etc., for transmission to other wireless communication devices (e.g., the client stations 154) to inform the other wireless communication devices of capabilities of the AP 114, according to an embodiment. Similarly, the client station 154-1 includes the IE 1100 in MAC management frames such as a probe request frame, an association request frame, a reassociation request frame, etc., for transmission to other wireless communication devices (e.g., the AP 114) to inform the other wireless communication devices of capabilities of the client station 154-1, according to an embodiment.

Upon receiving the IE 1100 from a first communication device, a second communication device uses (e.g., the network interface device 122 uses, the MAC processor 130 uses, the network interface device 162 uses, the MAC processor 170 uses, etc.) capability information included in the IE 1100 to determine transmission parameters (e.g., an MCS, a number of spatial streams, etc.) to use when transmitting packets to the first communication device via a punctured operating channel, according to an embodiment.

The IE 1100 includes an element ID field 1104 that indicates a format of the IE 1100. For example, the element ID field 104 indicates that the IE 1100 includes a field 1108 that indicates a set of MCSs and a number of spatial streams supported by the first communication device, and having a particular format. For example, the element ID field 1104 indicates that the IE 1100 includes the field 1108, and that the field 1108 has a particular format.

FIG. 11B is a diagram of an example format of the field 1108 of FIG. 11A, according to an embodiment. FIG. 11B indicates example lengths of various subfields of the field 1108, according to an embodiment. In other embodiments, subfields of the field 1108 have other suitable lengths. Additionally, in other embodiments, the field 1108 includes suitable subfields other than those shown in FIG. 11B, and/or omits one or more of the subfields shown in FIG. 11B.

The field 1108 includes a subfield 1132 that indicates a set of MCSs and numbers of spatial streams (Nss) supported by the first communication device when receiving via an operating channel spanning an overall bandwidth less than or equal to 80 MHz. A subfield 1136 indicates a set of MCSs and Nss supported by the first communication device when transmitting via an operating channel spanning an overall bandwidth less than or equal to 80 MHz. A subfield 1140 indicates a set of MCSs and Nss supported by the first communication device when receiving via an operating channel that includes sub-channels in two contiguous 80 MHz frequency portions. A subfield 1144 indicates a set of MCSs and Nss supported by the first communication device when transmitting via an operating channel that includes sub-channels in two contiguous 80 MHz frequency portions. A subfield 1148 indicates a set of MCSs and Nss supported by the first communication device when receiving via an operating channel that includes sub-channels in two 80 MHz frequency portions that are separated in frequency by a gap. A subfield 1152 indicates a set of MCSs and Nss supported by the first communication device when transmitting via an operating channel that includes sub-channels in two 80 MHz frequency portions that are separated in frequency by a gap.

When the second communication device is to transmit a PPDU (e.g., an MU PPDU or an SU PPDU) in sub-channels in two contiguous 80 MHz frequency portions of a punctured operating channel to the first communication device, the second communication device selects (e.g., the network interface device 122 selects, the MAC processor 130 selects, the network interface device 162 selects, the MAC processor 170 selects, etc.) an MCS and selects an Nss from the set of MCSs and Nss indicated in the field 1140, according to an embodiment. When the second communication device is to transmit a PPDU (e.g., an MU PPDU or an SU PPDU) in sub-channels in two 80 MHz frequency portions of a punctured operating channel that are separated in frequency by a gap to the first communication device, the second communication device selects (e.g., the network interface device 122 selects, the MAC processor 130 selects, the network interface device 162 selects, the MAC processor 170 selects, etc.) an MCS and selects an Nss from the set of MCSs and Nss indicated in the field 1148, according to an embodiment.

When the AP 114 is to prompt a trigger-based PPDU from a client station 154 in sub-channels in two contiguous 80 MHz frequency portions of a punctured operating channel, the AP 114 selects (e.g., the network interface device 122 selects, the MAC processor 130 selects, etc.) an MCS and selects an Nss from the set of MCSs and Nss indicated in the field 1144, and includes indication(s) of the selected MCS and the selected Nss in the trigger frame, according to an embodiment. When the AP 114 is to prompt a trigger-based PPDU from a client station 154 in sub-channels in two 80 MHz frequency portions of a punctured operating channel that are separated in frequency by a gap to the first communication device, the AP 114 selects (e.g., the network interface device 122 selects, the MAC processor 130 selects, etc.) an MCS and selects an Nss from the set of MCSs and Nss indicated in the field 1152, and includes indication(s) of the selected MCS and the selected Nss in the trigger frame, according to an embodiment.

FIG. 11C is a diagram of another example format 1170 of the field 1108 of FIG. 11A, according to an embodiment. FIG. 11C indicates example lengths of various subfields of the field 1170, according to an embodiment. In other embodiments, subfields of the field 1170 have other suitable lengths. Additionally, in other embodiments, the field 1170 includes suitable subfields other than those shown in FIG. 11C, and/or omits one or more of the subfields shown in FIG. 11C.

The field 1170 includes a subfield 1174 that indicates a set of MCSs and Nss supported by the first communication device when receiving via an operating channel having a cumulative bandwidth less than or equal to 80 MHz. A subfield 1178 indicates a set of MCSs and Nss supported by the first communication device when transmitting via an operating channel having a cumulative bandwidth less than or equal to 80 MHz. A subfield 1182 indicates a set of MCSs and Nss supported by the first communication device when receiving via an operating channel that has a cumulative bandwidth greater than 80 MHz (and less than or equal to 160 MHz) within two contiguous 80 MHz frequency portions. A subfield 1186 indicates a set of MCSs and Nss supported by the first communication device when transmitting via an operating channel that has a cumulative bandwidth greater than 80 MHz (and less than or equal to 160 MHz) within two contiguous 80 MHz frequency portions. A subfield 1190 indicates a set of MCSs and Nss supported by the first communication device when receiving via an operating channel that has a cumulative bandwidth greater than 80 MHz (and less than or equal to 160 MHz) in two 80 MHz frequency portions that are separated in frequency by a gap. A subfield 1194 indicates a set of MCSs and Nss supported by the first communication device when transmitting via an operating channel that has a cumulative bandwidth greater than 80 MHz (and less than or equal to 160 MHz) in two 80 MHz frequency portions that are separated in frequency by a gap.

When the second communication device is to transmit a PPDU (e.g., an MU PPDU or an SU PPDU) to the first communication device in a punctured operating channel having a cumulative bandwidth less than or equal to 80 MHz, the second communication device selects (e.g., the network interface device 122 selects, the MAC processor 130 selects, the network interface device 162 selects, the MAC processor 170 selects, etc.) an MCS and selects an Nss from the set of MCSs and Nss indicated in the field 1174, according to an embodiment.

When the second communication device is to transmit a PPDU (e.g., an MU PPDU or an SU PPDU) to the first communication device in a punctured operating channel having a cumulative bandwidth greater than 80 MHz (and less than or equal to 160 MHz) in sub-channels in two contiguous 80 MHz frequency portions, the second communication device selects (e.g., the network interface device 122 selects, the MAC processor 130 selects, the network interface device 162 selects, the MAC processor 170 selects, etc.) an MCS and selects an Nss from the set of MCSs and Nss indicated in the field 1182, according to an embodiment. When the second communication device is to transmit a PPDU (e.g., an MU PPDU or an SU PPDU) to the first communication device in a punctured operating channel having a cumulative bandwidth greater than 80 MHz (and less than or equal to 160 MHz) in sub-channels in two 80 MHz frequency portions of a punctured operating channel that are separated in frequency by a gap, the second communication device selects (e.g., the network interface device 122 selects, the MAC processor 130 selects, the network interface device 162 selects, the MAC processor 170 selects, etc.) an MCS and selects an Nss from the set of MCSs and Nss indicated in the field 1190, according to an embodiment.

When the AP 114 is to prompt a trigger-based PPDU from a client station 154 in a punctured operating channel having a cumulative bandwidth less than or equal to 80 MHz, the AP 114 selects (e.g., the network interface device 122 selects, the MAC processor 130 selects, etc.) an MCS and selects an Nss from the set of MCSs and Nss indicated in the field 1178, and includes indication(s) of the selected MCS and the selected Nss in the trigger frame, according to an embodiment.

When the AP 114 is to prompt a trigger-based PPDU from a client station 154 in a punctured operating channel having a cumulative bandwidth greater than 80 MHz (and less than or equal to 160 MHz) in sub-channels in two contiguous 80 MHz frequency portions, the AP 114 selects (e.g., the network interface device 122 selects, the MAC processor 130 selects, etc.) an MCS and selects an Nss from the set of MCSs and Nss indicated in the field 1186, and includes indication(s) of the selected MCS and the selected Nss in the trigger frame, according to an embodiment. When the AP 114 is to prompt a trigger-based PPDU from a client station 154 in a punctured operating channel having a cumulative bandwidth greater than 80 MHz (and less than or equal to 160 MHz) in sub-channels in two 80 MHz frequency portions of a punctured operating channel that are separated in frequency by a gap to the first communication device, the AP 114 selects (e.g., the network interface device 122 selects, the MAC processor 130 selects, etc.) an MCS and selects an Nss from the set of MCSs and Nss indicated in the field 1194, and includes indication(s) of the selected MCS and the selected Nss in the trigger frame, according to an embodiment.

Referring again to FIG. 1, when a communication device in the WLAN 110 is to transmit a PPDU via a punctured operating channel, the communication device can use any idle sub-channels within the punctured operating channel when transmitting the PPDU. For example, the network interface device 122 may use the energy sensor(s) 142 to determine which sub-channels within the punctured operating channel are idle, and then transmit the PPDU via the sub-channels within the punctured operating channel that are determined to be idle. In an embodiment, if a primary sub-channel within the punctured operating channel is busy, the PPDU cannot be transmitted; instead, a backoff procedure is performed in which the network interface device 122 waits for a time period before trying again to transmit the PPDU.

Additionally, a first communication device in the WLAN 110 can exchange MAC control frames (such as RTS frames and CTS frames) with one or more second communication devices prior to transmitting the PPDU to ensure that both the first communication device and the second communication device agree on a set of sub-channels within the punctured operating channel that are idle. An RTS/CTS exchange can also be used to reserve at least a portion of the punctured operating channel for a particular time period, sometimes referred to as a TXOP, in some embodiments. After completing the RTS/CTS exchange to determine the set of sub-channels within the punctured operating channel that are idle, the first communication device can transmit one or more PPDUs to the second communication device(s) via the set of sub-channels within the punctured operating channel that are determined to be idle.

Figure 12A:
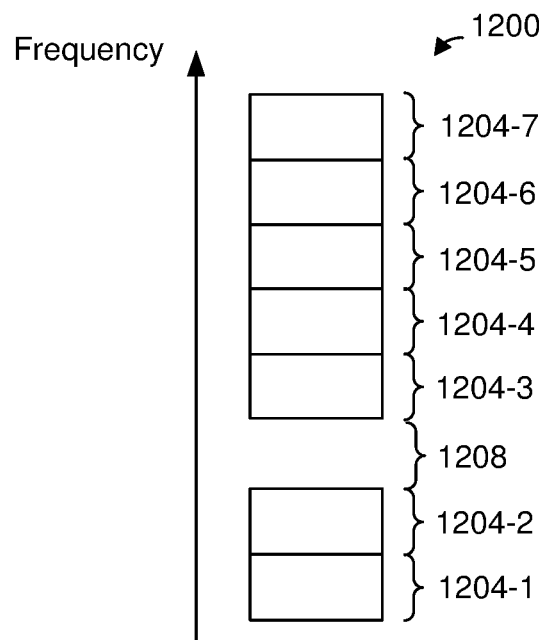
FIG. 12A is a diagram of an example punctured operating channel, according to an embodiment.

FIG. 12A is a diagram of an example punctured operating channel 1200, according to an embodiment. The punctured operating channel 1200 comprises a plurality of sub-channels 1204. Additionally, one or more sub-channels 1208 are not used. Although FIG. 12A illustrates the punctured operating channel 1200 as including seven sub-channels 1204, in other embodiments the punctured operating channel 1200 includes a suitable number of sub-channels 1204 other than seven. Although FIG. 12A illustrates the punctured operating channel 1200 not using one sub-channel 1208, in other embodiments the punctured operating channel 1200 does not use a suitable number of sub-channels 1208 other than one.

Figure 12B:
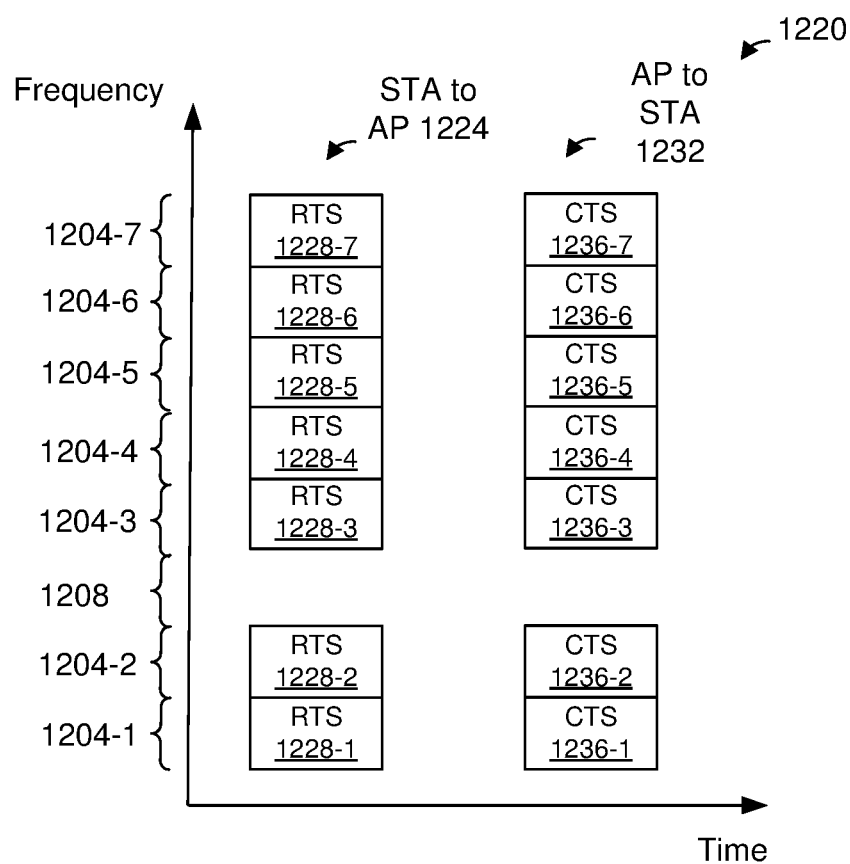
FIG. 12B is a diagram of an example communication exchange in the punctured operating channel of FIG. 12A, according to an embodiment.

FIG. 12B is a diagram of an example RTS-CTS communication exchange 1220 via the punctured operating channel 1200 of FIG. 12A, according to an embodiment. In an embodiment, the RTS-CTS communication exchange 1220 is used to establish a TXOP for a punctured operating channel.

In a UL transmission 1224, the client station 154-1 transmits (e.g., the network interface device 162 transmits) a plurality of RTS frames 1228 in sub-channels 1204 (and does not transmit anything in the sub-channel(s) 1208). For example, in the scenario illustrated in FIG. 12B, the client station 154-1 determines (e.g., the network interface device 162 determines) that all of the sub-channels 1204 are idle (from the standpoint of the client station 154-1), and in response the client station 154-1 transmits (e.g., the network interface device 162 transmits) a plurality of RTS frames 1228 in sub-channels 1204 (and does not transmit anything in the sub-channel(s) 1208).

Upon receiving the RTS frames 1228 in the sub-channels 1204, the AP 114 determines (e.g., the network interface device 162 determines) whether the sub-channels 1204 are idle (from the standpoint of the AP 114). In the scenario illustrated in FIG. 12B, the AP 114 determines (e.g., the network interface device 122 determines) that all of the sub-channels 1204 are idle. In response to determining that all of the sub-channels 1204 are idle, the AP 114 transmits (e.g., the network interface device 122 transmits) a DL transmission 1232 that includes a plurality of CTS frames 1232 in sub-channels 1204 (and does not transmit anything in the sub-channel(s) 1208).

Upon receiving the CTS frames 1232 in the sub-channels 1204, the client station 154-1 determines (e.g., the network interface device 162 determines) that the sub-channels 1204 are idle also from the standpoint of the AP 114. The client station 154-1 subsequently transmits (e.g., the network interface device 162 transmits) a PPDU (not shown) to the AP 114 via the sub-channels 1204.

Figure 12C:
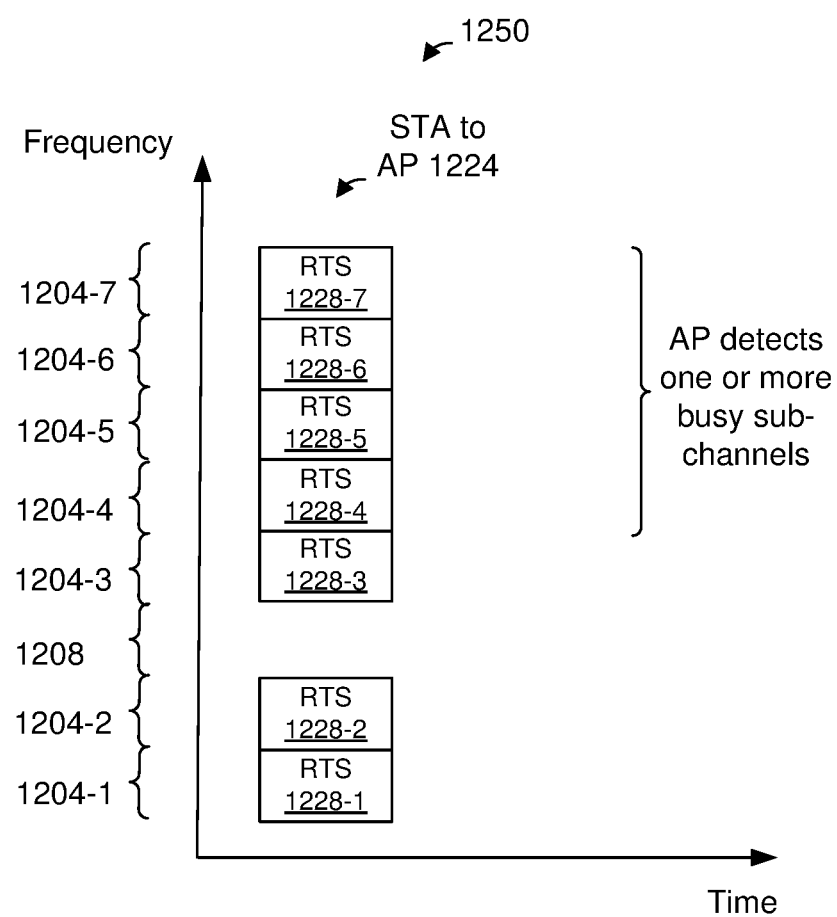
FIG. 12C is a diagram of another example communication exchange in the punctured operating channel of FIG. 12A, according to another embodiment.

FIG. 12C is a diagram of another example RTS-CTS communication exchange 1250 via the punctured operating channel 1200 of FIG. 12A, according to an embodiment.

Upon receiving the RTS frames 1228 in the sub-channels 1204, the AP 114 determines (e.g., the network interface device 162 determines) that at least the sub-channels 1204-1, 1204-2, and 1204-3 are idle, but that one or more of the sub-channels 1204-4 through 1204-7 are busy (from the standpoint of the AP 114). In response to determining that some of the sub-channels 1204 are busy, the AP 114 does not respond to the RTS frames 1228 in any of the sub-channels 1204.

In response to not receiving any CTS in response to the RTS frames 1228, the client station 154-1 determines (e.g., the network interface device 162 determines) that at least some of the sub-channels 1204 are busy from the standpoint of the AP 114.

Figure 12D:
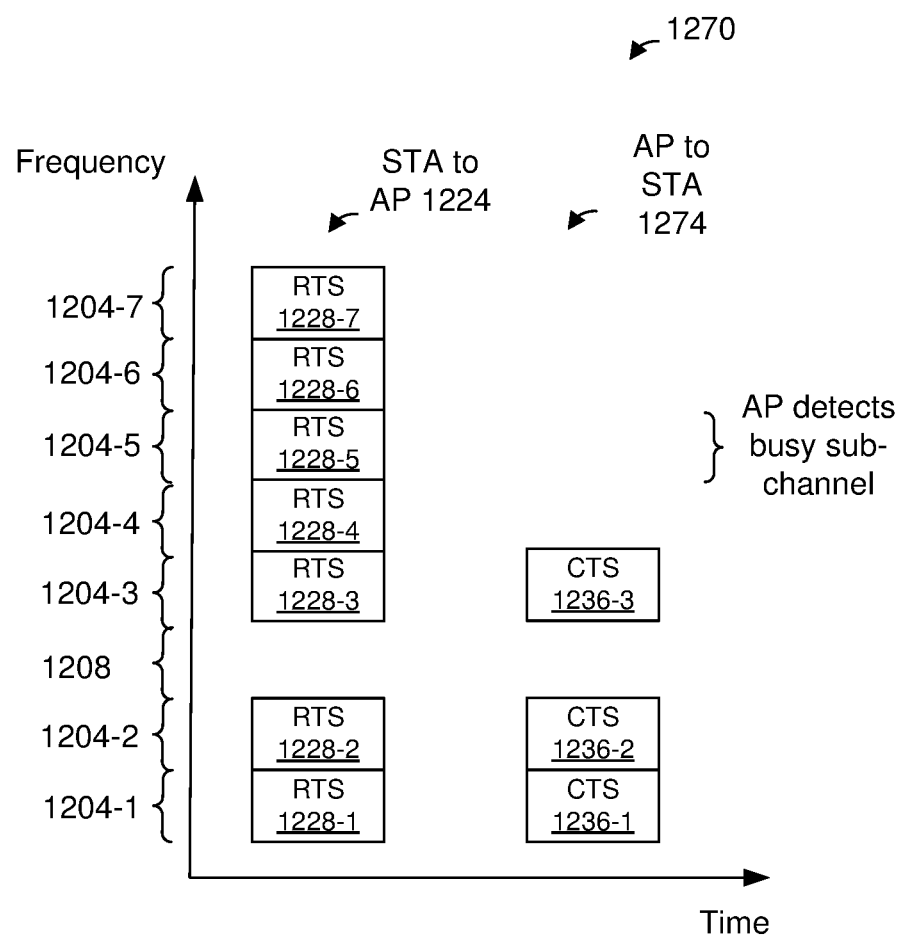
FIG. 12D is a diagram of another example communication exchange in the punctured operating channel of FIG. 12A, according to another embodiment.

FIG. 12D is a diagram of another example RTS-CTS communication exchange 1270 via the punctured operating channel 1200 of FIG. 12A, according to an embodiment. In an embodiment, the RTS-CTS communication exchange 1270 is used to establish a TXOP that uses only a subset of active sub-channels in a punctured operating channel.

Upon receiving the RTS frames 1228 in the sub-channels 1204, the AP 114 determines (e.g., the network interface device 162 determines) that the sub-channels 1204-1, 1204-2, 1204-3, 1204-4, 1204-6, and 1204-7 are idle, but that the sub-channel 1204-5 is busy (from the standpoint of the AP 114). In response to determining that the sub-channels 1204-1, 1204-2, 1204-3, 1204-4, 1204-6, and 1204-7 are idle, but that the sub-channel 1204-5 is busy, the AP 114 transmits (e.g., the network interface device 122 transmits) a DL transmission 1274 that includes a plurality of CTS frames 1232 in sub-channels 1204-1, 1204-2, and 1204-3 (which corresponds to a first allowed 80 MHz composite channel), and does not transmit anything in the sub-channel(s) 1208. Additionally, the AP 114 does not transmit (e.g., the network interface device 122 does not transmit) anything in the sub-channels 1204-4 through 1204-7 (which corresponds to a second allowed 80 MHz composite channel).

Upon receiving the CTS frames 1236 in the sub-channels 1204-1, 1204-2, and 1204-3, the client station 154-1 determines (e.g., the network interface device 162 determines) that the sub-channels 1204-1, 1204-2, and 1204-3 are idle also from the standpoint of the AP 114 (but that one or more of the sub-channels 1204-4 through 1204-7 are busy from the standpoint of the AP 114). The client station 154-1 subsequently transmits (e.g., the network interface device 162 transmits) a PPDU (not shown) to the AP 114 via the sub-channels 1204-1, 1204-2, and 1204-3.

Figure 12E:
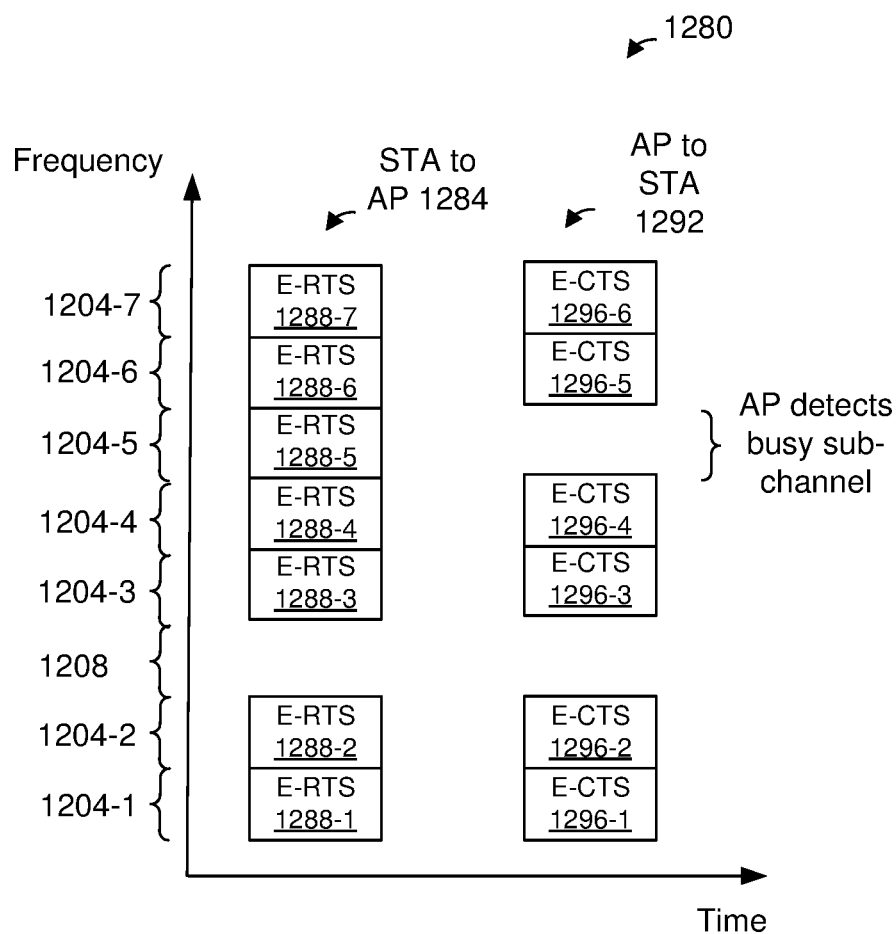
FIG. 12E is a diagram of another example communication exchange in the punctured operating channel of FIG. 12A, according to another embodiment.

FIG. 12E is a diagram of another example RTS-CTS communication exchange 1280 via the punctured operating channel 1200 of FIG. 12A, according to an embodiment. In an embodiment, the RTS-CTS communication exchange 1280 is used to establish a TXOP that uses only a subset of active sub-channels in a punctured operating channel. In particular, additional sub-channels within an already punctured operating channel are punctured for the TXOP, in an embodiment.

In a UL transmission 1284, the client station 154-1 transmits (e.g., the network interface device 162 transmits) a plurality of enhanced RTS (E-RTS) frames 1288 in sub-channels 1204 (and does not transmit anything in the sub-channel(s) 1208). For example, in the scenario illustrated in FIG. 12E, the client station 154-1 determines (e.g., the network interface device 162 determines) that all of the sub-channels 1204 are idle (from the standpoint of the client station 154-1), and in response the client station 154-1 transmits (e.g., the network interface device 162 transmits) a plurality of E-RTS frames 1288 in sub-channels 1204 (and does not transmit anything in the sub-channel(s) 1208). In an embodiment, each E-RTS frame 1288 includes a bitmap that indicates i) in which sub-channels the E-RTS frames 1288 were transmitted and ii) in which sub-channels the E-RTS frames 1288 were not transmitted. In an embodiment, each E-RTS frame 1288 includes a bitmap that indicates i) the sub-channel(s) that are idle from the standpoint of the client station 154 and ii) the sub-channel(s) that are busy from the standpoint of the client station 154. In an embodiment, each bit in the bitmap corresponds to a respective sub-channel in the overall bandwidth of the punctured operating channel. In the scenario illustrated in FIG. 12E, the bitmap in each E-RTS frame 1288 indicates that i) all of the sub-channels 1204 are idle from the standpoint of the client station 154, and ii) the sub-channel 1208 is busy from the standpoint of the client station 154.

Upon receiving the RTS frames 1288 in the sub-channels 1204, the AP 114 determines (e.g., the network interface device 162 determines) whether the sub-channels 1204 are idle (from the standpoint of the AP 114). In the scenario illustrated in FIG. 12E, the AP 114 determines (e.g., the network interface device 122 determines) that all of the sub-channels 1204 are idle except for the sub-channel 1204-5, which the AP 114 determines (e.g., the network interface device 122 determines) is busy. In response to determining that all of the sub-channels 1204 are idle except for the sub-channel 1204-5, the AP 114 transmits (e.g., the network interface device 122 transmits) a DL transmission 1292 that includes a plurality of enhanced CTS (E-CTS) frames 1296 in all of the sub-channels 1204 except for the sub-channel 1204-5 (and does not transmit anything in the sub-channel(s) 1208). In an embodiment, each E-CTS frame 1296 includes a bitmap that indicates i) in which sub-channels the E-CTS frames 1296 were transmitted and ii) in which sub-channels the E-RTS frames 1288 were not transmitted. In an embodiment, each E-CTS frame 1296 includes a bitmap that indicates i) the sub-channel(s) that are idle from the standpoint of the AP 114 and ii) the sub-channel(s) that are busy from the standpoint of the AP 114. In an embodiment, each bit in the bitmap corresponds to a respective sub-channel in the overall bandwidth of the punctured operating channel. In the scenario illustrated in FIG. 12E, the bitmap in each E-CTS frame 1296 indicates that i) the sub-channels 1204-1, 1204-2, 1204-3, 1204-4, 1204-6, and 1204-7 are idle from the standpoint of the client station 154, and ii) the subchannel 1204-5 and the sub-channel 1208 are busy from the standpoint of the AP 114.

Upon receiving the E-CTS frames 1296 in the sub-channels 1204-1, 1204-2, 1204-3, 1204-4, 1204-6, and 1204-7, and upon processing the bitmaps in the E-CTS frames 1296, the client station 154-1 determines (e.g., the network interface device 162 determines) that the sub-channels 1204-1, 1204-2, 1204-3, 1204-4, 1204-6, and 1204-7 are idle also from the standpoint of the AP 114, but that the sub-channel 1204-5 is busy from the standpoint of the AP 114. The client station 154-1 subsequently transmits (e.g., the network interface device 162 transmits) a PPDU (not shown) to the AP 114 via the sub-channels 1204-1, 1204-2, 1204-3, 1204-4, 1204-6, and 1204-7.

Figure 13A:
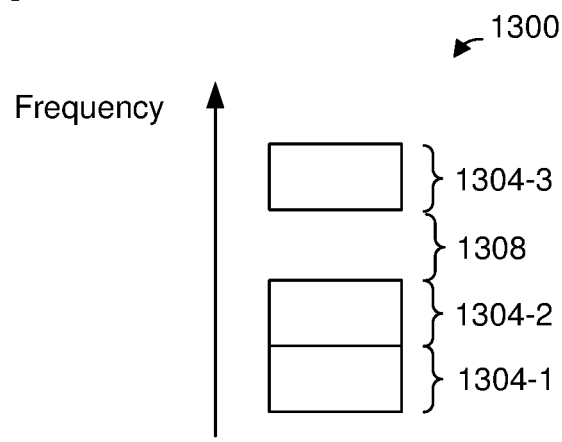
FIG. 13A is a diagram of an example punctured operating channel, according to an embodiment.

FIG. 13A is a diagram of an example punctured operating channel 1300, according to an embodiment. The punctured operating channel 1300 comprises a plurality of sub-channels 1304. Additionally, one or more sub-channels 1308 are not used. Although FIG. 13A illustrates the punctured operating channel 1300 as including three sub-channels 1204, in other embodiments the punctured operating channel 1300 includes a suitable number of sub-channels 1304 other than three. Although FIG. 13A illustrates the punctured operating channel 1300 not using one sub-channel 1308, in other embodiments the punctured operating channel 1300 does not use a suitable number of sub-channels 1308 other than one.

Figure 13B:
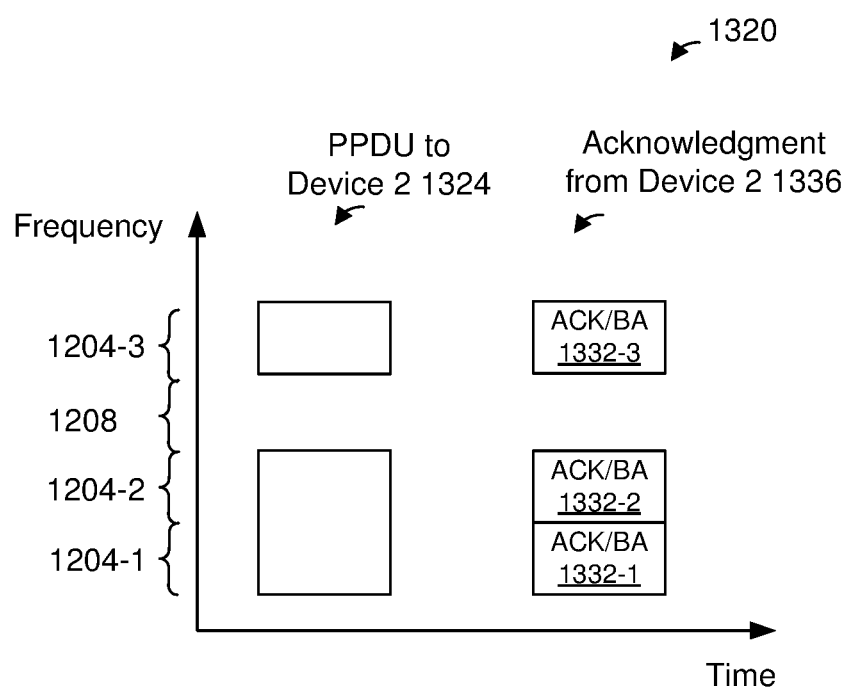
FIG. 13B is a diagram of an example communication exchange in the punctured operating channel of FIG. 13A, according to an embodiment.

FIG. 13B is a diagram of an example communication exchange 1320 via the punctured operating channel 1300 of FIG. 13A, according to an embodiment. One or more first communication devices (Device(s) 1) transmits a PPDU 1324 to a second communication device (Device 2) via the punctured operating channel 1300. In an embodiment, Device 1 is the client station 154-1, and the PPDU 1324 is an UL SU PPDU. In another embodiment, Device(s) 1 are a plurality of client stations 154, and the PPDU 1324 is an UL MU transmission.

In an embodiment, Device 1 is the AP 114, and the PPDU 1324 is a DL SU PPDU. In another embodiment, Device 1 is the AP 114, and the PPDU 1324 is a DL MU PPDU.

In response to the PPDU 1324, Device 2 transmits a plurality of duplicate PPDUs 1332 as part of a transmission 1336 to Device(s) 1 via the punctured operating channel 1300. In an embodiment, Device 2 is the AP 114, and the transmission 1336 is a DL transmission. In another embodiment, Device 2 is the client station 154-1, and the transmission 1336 is an UL transmission.

The duplicate PPDUs 1332 include acknowledgment and/or block acknowledgement information corresponding to the PPDU 1324. For example, each PPDU 1332 includes an ACK frame, according to an embodiment. As another example, each PPDU 1332 includes a BlockAck frame, according to an embodiment.

Although FIG. 13B illustrates the duplicate PPDUs 1332 being transmitted in the same sub-channels in which the PPDU 1324 was transmitted, in other embodiments, one or more PPDUs 1332 are transmitted in only a subset of the sub-channels in which the PPDU 1324 was transmitted. In one embodiment, Device 2 decides the subset of the sub-channels to transmit the one or more PPDUs 1332. In another embodiment, the PPDU 1324 specifies (e.g., within a MAC control frame (e.g., an HE control frame) within the PPDU 1324) the subset of the sub-channels to transmit the one or more PPDUs 1332.

In an embodiment, the PPDUs 1332 have a PHY PPDU format that conforms to a legacy communication protocol, such as the IEEE 802.11a Standard or the IEEE 802.11g Standard, or another suitable legacy protocol. In an embodiment, a cyclic shift is applied to at least some of the PPDUs 1332. In an embodiment, the PPDUs 1332 are transmitted in a manner similar to the duplicate PPDUs 454 described with reference to FIG. 4C.

Figure 13C:
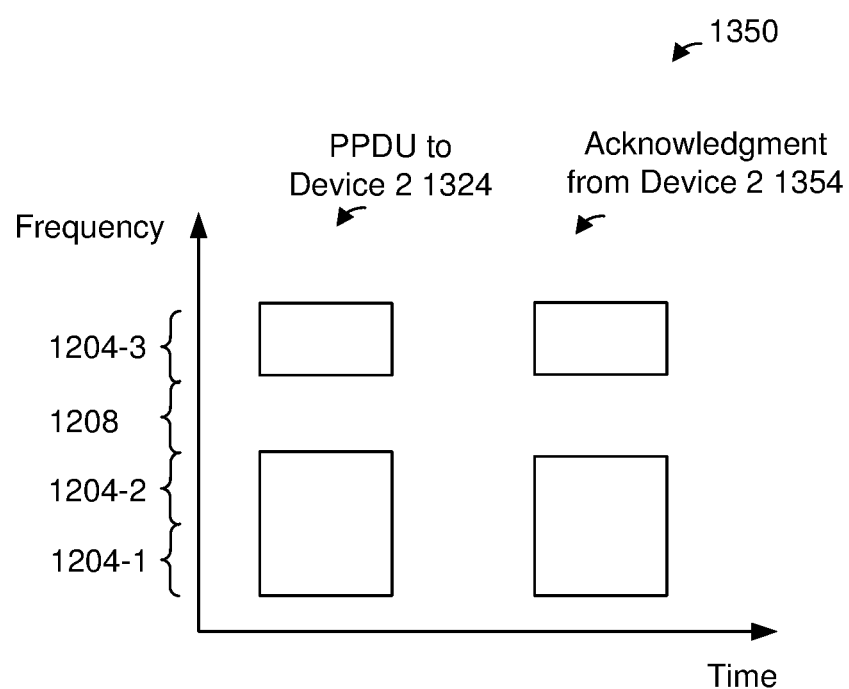
FIG. 13C is a diagram of another example communication exchange in the punctured operating channel of FIG. 13A, according to another embodiment.

FIG. 13C is a diagram of another example communication exchange 1350 via the punctured operating channel 1300 of FIG. 13A, according to an embodiment. Device(s) 1 transmit the PPDU 1324 to Device 2 via the punctured operating channel 1300. In an embodiment, Device 1 is the client station 154-1, and the PPDU 1324 is an UL SU PPDU. In another embodiment, Device(s) 1 are a plurality of client stations 154, and the PPDU 1324 is an UL MU transmission.

In an embodiment, Device 1 is the AP 114, and the PPDU 1324 is a DL SU PPDU. In another embodiment, Device 1 is the AP 114, and the PPDU 1324 is a DL MU PPDU.

In response to the PPDU 1324, Device 2 transmits a PPDU 1354 to Device(s) 1 via the punctured operating channel 1300. In an embodiment, Device 2 is the AP 114, and the transmission 1336 is a DL transmission. In another embodiment, Device 2 is the client station 154-1, and the transmission 1336 is an UL transmission. In an embodiment, the PPDU 1354 is an SU transmission to a single Device 1. In another embodiment, the PPDU 1354 is an MU transmission to multiple Devices 1.

The PPDU 1354 includes acknowledgment and/or block acknowledgement information corresponding to the PPDU 1324. For example, the PPDU 1354 includes one or more ACK frames, according to an embodiment. As another example, the PPDU 1354 includes one or more BlockAck frames, according to an embodiment. As another example, the PPDU 1354 includes a multi-user BlockAck frame, according to an embodiment.

Although FIG. 13C illustrates the PPDU 1354 being transmitted in the same sub-channels in which the PPDU 1324 was transmitted, in other embodiments, the PPDU 1354 is transmitted in only a subset of the sub-channels in which the PPDU 1324 was transmitted. In one embodiment, Device 2 decides the subset of the sub-channels to transmit the PPDU 1354. In another embodiment, the PPDU 1324 specifies (e.g., within a MAC control frame (e.g., an HE control frame) within the PPDU 1324) the subset of the sub-channels to transmit the PPDU 1354.

In an embodiment in which transmission of duplicate PPDUs via a punctured operating channel is supported by the communication devices in the WLAN 110, if the PPDU 1324 uses space-time block coding (STBC), the acknowledgement information is transmitted in the PPDU 1354 using STBC; on the other hand, if the PPDU 1324 does not use STBC, the acknowledgement information is transmitted in the duplicate PPDUs 1332 (FIG. 13B). In an embodiment in which transmission of duplicate PPDUs via a punctured operating channel is not supported by the communication devices in the WLAN 110, the acknowledgement information is transmitted in the PPDU 1354; if the PPDU 1324 uses STBC, the acknowledgement information is transmitted in the PPDU 1354 using STBC, and if the PPDU 1324 does not use STBC, the acknowledgement information is transmitted in the PPDU 1354 without using STBC.

In another embodiment, the PPDU 1324 specifies (e.g., within an HE control field) within the PPDU 1324) a format of the PPDU(s) to use when acknowledging the PPDU 1324. For example, in an embodiment, if the PPDU 1324 specifies that a duplicate PPDU is to be used to acknowledge the PPDU 1324, Device 2 transmits the acknowledgement information in the duplicate PPDUs 1332 (FIG. 13B); on the other hand, if the PPDU 1324 specifies that a duplicate PPDU is to be used to acknowledge the PPDU 1324, the acknowledgement information is transmitted in the PPDU 1354 (FIG. 13C). As another example, in an embodiment, if the PPDU 1324 specifies that the acknowledgment should be transmitted using STBC, Device 2 transmits the acknowledgement information using STBC; on the other hand, if the PPDU 1324 specifies that the acknowledgment should not be transmitted using STBC, the acknowledgement information is not transmitted using STBC.

In another embodiment, the PPDU 1324 specifies (e.g., within an HE control field) within the PPDU 1324) an MCS to use when acknowledging the PPDU 1324. Device 2 then generates and transmits the duplicate PPDUs 1332 (FIG. 13B) or the PPDU 1354 (FIG. 13C) using the MCS specified by the PPDU 1324.

Figure 14:
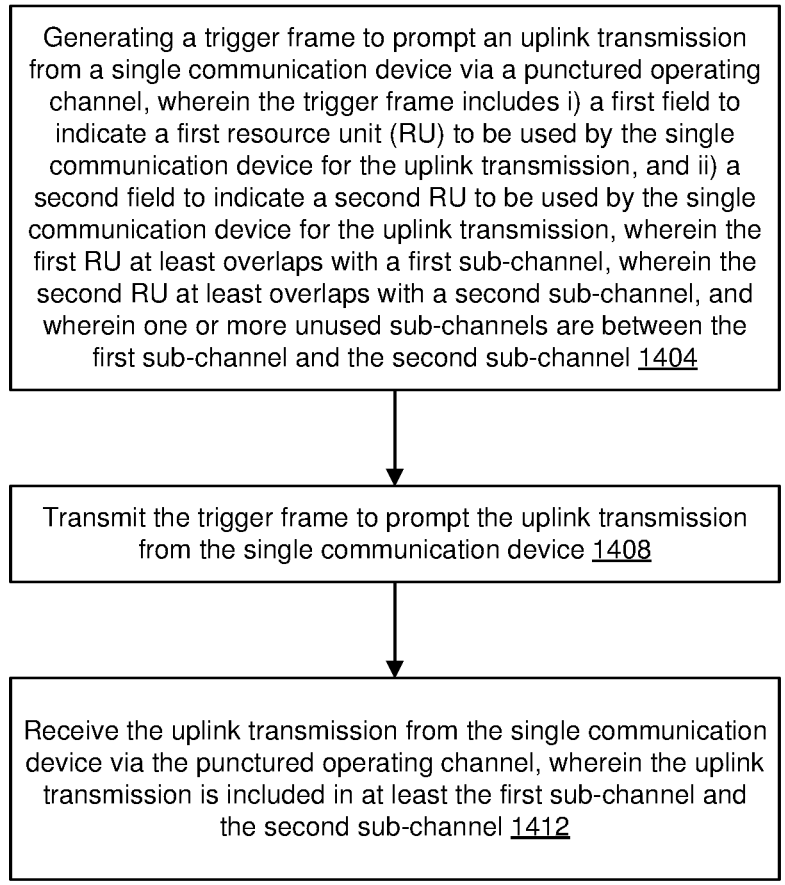
FIG. 14 is a flow diagram of an example method for performing an uplink transmission via a punctured operating channel, according to an embodiment.

FIG. 14 is a flow diagram of an example method 1400 for performing an uplink transmission via a punctured operating channel, according to an embodiment. In some embodiments, the AP 114 of FIG. 1 is configured to implement the method 1400. The method 1400 is described, however, in the context of the AP 114 merely for explanatory purposes and, in other embodiments, the method 1400 is implemented by another suitable device such as the client station 154-1 or another suitable wireless communication device.

At block 1404, the AP 114 generates (e.g., the network interface device 122 generates, the MAC processor 126 generates, etc.) a trigger frame to prompt an uplink transmission from a single client station 154 via the punctured operating channel. In an embodiment, the punctured operating channel has an overall bandwidth that spans contiguous sub-channels within a single radio frequency (RF) band, and wherein one or more sub-channels within the overall bandwidth are not used for the operating channel. In an embodiment, the punctured operating channel is established using techniques such as described above.

The trigger frame includes i) a first field to indicate a first resource unit (RU) that the single communication device is to use for the uplink transmission, and ii) a second field to indicate a second RU to be used by the single communication device for the uplink transmission. In an embodiment, the first RU at least overlaps with a first sub-channel, the second RU at least overlaps with a second sub-channel, and one or more unused sub-channels are between (in frequency) the first sub-channel and the second sub-channel.

At block 1408, the AP 114 transmits (e.g., the network interface device 122 transmits) the trigger frame via the punctured operating channel to prompt the uplink transmission from the single client station 154. In an embodiment, the method 1400 further includes generating a packet that includes the trigger frame, and transmitting the trigger frame at block 1408 includes transmitting the trigger frame in the packet via the punctured operating channel.

In an embodiment, the method 1400 further includes generating a plurality of duplicate packets that are formatted according to a legacy communication protocol (e.g., the IEEE 802.11a Standard protocol, the IEEE 802.11g Standard protocol, etc.) and that each include the trigger frame, and respectively transmitting the duplicate packets via sub-channels in the punctured operating channel (and not transmitting any packets in any of the unused sub-channels).

At block 1412, the AP 114 receives (e.g., the network interface device 122 receives) the uplink transmission from the single client station via the punctured operating channel. In an embodiment, the uplink transmission is included in at least the first sub-channel and the second sub-channel. In an embodiment, the uplink transmission is included in at least the first RU and the second RU.

In an embodiment, the method 1400 further includes selecting an MCS that the single client station 154 is to use for the uplink transmission, and wherein generating the trigger frame at block 1404 includes generating the trigger frame to include an indication of the selected MCS. In an embodiment, selecting the MCS that the single client station 154 is to use for the uplink transmission includes using any of the MCS selection techniques described above.

In an embodiment, the method 1400 further includes selecting a number of spatial streams that the single client station 154 is to use for the uplink transmission, and wherein generating the trigger frame at block 1404 includes generating the trigger frame to include an indication of the selected number of spatial streams. In an embodiment, selecting the number of spatial streams that the single client station 154 is to use for the uplink transmission includes using any of the number of spatial stream selection techniques described above.

In an embodiment, the method 1400 further comprises: selecting a plurality of RUs (including the first RU and the second RU) that the single communication device is to use for the uplink transmission based on the sub-channels included in the punctured operating channel, excluding those sub-channels that are not being used in the punctured operating channel. In an embodiment, the punctured operating channel includes a primary sub-channel, and the first RU is selected to at least overlap with the primary sub-channel. In another embodiment, the punctured operating channel includes a primary sub-channel, and the first RU is selected to at least overlap with the primary sub-channel and at least the second RU is selected to not overlap with the primary sub-channel.

In other embodiments, the method 1400 is modified to prompt an UL MU transmission from multiple client stations via the punctured operating channel, wherein the first RU and the second RU correspond to different client stations.

Embodiment 1: A method for establishing an operating channel for a wireless local area network (WLAN), the method comprising: determining, at a communication device, an overall bandwidth of the operating channel, wherein the overall bandwidth spans a plurality of sub-channels; determining, at the communication device, that one or more sub-channels within the overall bandwidth will not be used for the operating channel; generating, at the communication device, a packet that includes i) a first subfield that indicates the overall bandwidth of the operating channel, and ii) a second subfield that indicates the one or more sub-channels within the overall bandwidth that will not be used for the operating channel; and transmitting, by the communication device, the packet to inform one or more other communication devices in the WLAN of the operating channel for the WLAN, the operating channel having the overall bandwidth, wherein the indicated one or more sub-channels within the overall bandwidth are not to be used.

Embodiment 2: The method of embodiment 1, wherein transmitting the packet informs the one or more other communication devices that the operating channel is to be used until the communication device specifies a change to the operating channel.

Embodiment 3: The method of either of embodiments 1 or 2, wherein generating the packet comprises: generating, at the communication device, a medium access control (MAC) management frame that includes i) the first subfield that indicates the overall bandwidth of the operating channel, and ii) the second subfield that indicates the one or more sub-channels within the overall bandwidth that will not be used for the operating channel; and generating, at the communication device, the packet to include the MAC management frame.

Embodiment 4: The method of embodiment 3, wherein the MAC management frame comprises one of: i) a beacon frame, ii) a probe response frame, iii) an association response frame, or iv) a reassociation response frame.

Embodiment 5: The method of any of embodiments 1-4, wherein: the communication device is a first communication device; the one or more other communication devices are one or more second communication devices that are configured to operate according to a first communication protocol; the operating channel is a first operating channel to be used by the one or more second communication devices; the method further comprises: determining, at the first communication device, a bandwidth of a second operating channel that is permitted by a second legacy communication protocol and that is to be used by one or more third communication devices in the WLAN that operate according to the second legacy communication protocol, wherein the bandwidth of the second operating channel is i) contiguous in frequency, ii) within the overall bandwidth of the first operating channel, and iii) does not span any of the one or more sub-channels that will not be used for the first operating channel; generating the packet includes generating the packet to include i) a third subfield that indicates the bandwidth of the second operating channel; and transmitting the packet also informs the one or more third communication devices in the WLAN of the second operating channel for the WLAN.

Embodiment 6: The method of any of embodiments 1-4, wherein: the communication device is a first communication device; the one or more other communication devices are one or more second communication devices that are configured to operate according to a first communication protocol; the operating channel is a first operating channel to be used by the one or more second communication devices; the packet is a first packet; and the method further comprises: determining, at the first communication device, a bandwidth of a second operating channel that is permitted by a second legacy communication protocol and that is to be used by one or more third communication devices in the WLAN that operate according to the second legacy communication protocol, wherein the bandwidth of the second operating channel is i) contiguous in frequency, ii) within the overall bandwidth of the first operating channel, and iii) does not span any of the one or more sub-channels that will not be used for the first operating channel, generating, at the first communication device, a second packet that includes a third subfield that indicates the bandwidth of the second operating channel, and transmitting, by the first communication device, the second packet to inform the one or more third communication devices in the WLAN of the second operating channel for the WLAN.

Embodiment 7: The method of any of embodiments 1-4, wherein the packet is a first packet, and wherein the method further comprises: generating, at the communication device, a second packet; and respectively transmitting, by the communication device, the second packet and duplicates of the second packet in the sub-channels of the operating channel, including not transmitting in the one or more sub-channels that are not used for the operating channel.

Embodiment 8: The method of embodiment 7, wherein the first packet conforms to a first communication protocol and the second packet conforms to a second legacy communication protocol different from the first communication protocol.

Embodiment 9: The method of any of embodiments 1-4, wherein the packet is a first packet, and wherein the method further comprises: selecting, at the communication device, a modulation and coding scheme (MCS) to be used for a second packet to be transmitted via the operating channel, including selecting the MCS based on the overall bandwidth of the operating channel; generating, at the communication device, the second packet according to the selected MCS; and transmitting, by the communication device, the second packet via the operating channel.

Embodiment 10: The method of any of embodiments 1-4, wherein the packet is a first packet, and wherein the method further comprises: selecting, at the communication device, a modulation and coding scheme (MCS) to be used for a second packet to be transmitted via the operating channel, including selecting the MCS based on a number of sub-channels used in the operating channel; generating, at the communication device, the second packet according to the selected MCS; and transmitting, by the communication device, the second packet via the operating channel.

Embodiment 11: The method of any of embodiments 1-4, wherein the packet is a first packet, wherein the communication device is a first communication device, and wherein the method further comprises, after transmitting the first packet: generating, at the first communication device, a request-to-send (RTS) frame; transmitting, by the first communication device, the RTS frame to a second communication device via the operating channel, including not transmitting in the one or more sub-channels that are not used for the operating channel; receiving, at the first communication device, a clear-to-send (CTS) frame from the second communication device via only a subset of sub-channels via the RTS frame was transmitted; and after receiving the CTS frame, transmitting, by the first communication device, a second packet to the second communication device via the only the subset of sub-channels via which the CTS frame was received.

Embodiment 12: The method of any of embodiments 1-4, wherein generating the packet comprises: generating the packet to include an information element that includes i) the first subfield that indicates the overall bandwidth of the operating channel, and ii) the second subfield that indicates the one or more sub-channels within the overall bandwidth that will not be used for the operating channel, wherein the information element is generated to include i) an element identifier (ID) field and ii) an element ID extension field that together indicate a format of the information element.

Embodiment 13: The method of embodiment 12, wherein generating the information element comprises: setting, at the communication device, a third subfield of the information element to indicate that the information element includes the second subfield.

Embodiment 14: The method of embodiment 12, wherein: the second subfield includes a bitmap; respective bits in the bitmap correspond to respective sub-channels within the overall bandwidth; and values of bits in the bitmap indicate whether respective sub-channels within the overall bandwidth will be used for the operating channel.

Embodiment 15: The method of any of embodiments 1-14, wherein the communication device is an access point.

Embodiment 16: The method of any of embodiments 1-15, wherein: determining the overall bandwidth comprises determining i) a first frequency segment of the overall bandwidth and ii) a second frequency segment of the overall bandwidth, wherein the first frequency segment and the second frequency segment are separated by a gap in frequency; generating the packet comprises generating the first subfield to indicate that the overall bandwidth comprises two frequency segments separated by a gap in frequency; and generating the packet comprises generating the packet to include i) a third subfield to indicate a first location in frequency of the first frequency segment and ii) a fourth subfield to indicate a second location in frequency of the second frequency segment.

Embodiment 17: A communication device, comprising: a network interface device having one or more integrated circuit (IC) devices, wherein the one or more IC devices are configured to: determine an overall bandwidth of an operating channel of a wireless local area network (WLAN), wherein the overall bandwidth spans a plurality of sub-channels, determine that one or more sub-channels within the overall bandwidth will not be used for the operating channel, generate a packet that includes i) a first subfield that indicates the overall bandwidth of the operating channel, and ii) a second subfield that indicates the one or more sub-channels within the overall bandwidth that will not be used for the operating channel, and transmit the packet to inform one or more other communication devices in the WLAN of the operating channel for the WLAN, the operating channel having the overall bandwidth, wherein the indicated one or more sub-channels within the overall bandwidth are not to be used.

Embodiment 18: The communication device of embodiment 17, wherein the one or more IC devices are configured to transmit the packet to inform the one or more other communication devices that the operating channel is to be used until the communication device specifies a change to the operating channel.

Embodiment 19: The communication device of either of embodiments 17 or 18, wherein the one or more IC devices are configured to: generate a medium access control (MAC) management frame that includes i) the first subfield that indicates the overall bandwidth of the operating channel, and ii) the second subfield that indicates the one or more sub-channels within the overall bandwidth that will not be used for the operating channel; and generate the packet to include the MAC management frame.

Embodiment 20: The communication device of embodiment 19, wherein the MAC management frame comprises one of: i) a beacon frame, ii) a probe response frame, iii) an association response frame, or iv) a reassociation response frame.

Embodiment 21: The communication device of any of embodiments 17-20, wherein: the communication device is a first communication device; the one or more other communication devices are one or more second communication devices that are configured to operate according to a first communication protocol; the operating channel is a first operating channel to be used by the one or more second communication devices; and the one or more IC devices are further configured to: determine a bandwidth of a second operating channel that is permitted by a second legacy communication protocol and that is to be used by one or more third communication devices in the WLAN that operate according to the second legacy communication protocol, wherein the bandwidth of the second operating channel is i) contiguous in frequency, ii) within the overall bandwidth of the first operating channel, and iii) does not span any of the one or more sub-channels that will not be used for the first operating channel, generate the packet to include i) a third subfield that indicates the bandwidth of the second operating channel, and transmit the packet to also inform the one or more third communication devices in the WLAN of the second operating channel for the WLAN.

Embodiment 22: The communication device of any of embodiments 17-20, wherein: the communication device is a first communication device; the one or more other communication devices are one or more second communication devices that are configured to operate according to a first communication protocol; the operating channel is a first operating channel to be used by the one or more second communication devices; the packet is a first packet; and the one or more IC devices are configured to: determine a bandwidth of a second operating channel that is permitted by a second legacy communication protocol and that is to be used by one or more third communication devices in the WLAN that operate according to the second legacy communication protocol, wherein the bandwidth of the second operating channel is i) contiguous in frequency, ii) within the overall bandwidth of the first operating channel, and iii) does not span any of the one or more sub-channels that will not be used for the first operating channel, generate a second packet that includes a third subfield that indicates the bandwidth of the second operating channel, and transmit the second packet to inform the one or more third communication devices in the WLAN of the second operating channel for the WLAN.

Embodiment 23: The communication device of any of embodiments 17-20, wherein the packet is a first packet, and wherein the one or more IC devices are further configured to: generate a second packet; and respectively transmit the second packet and duplicates of the second packet in the sub-channels of the operating channel, including not transmitting in the one or more sub-channels that are not used for the operating channel.

Embodiment 24: The communication device of embodiment 23, wherein the first packet conforms to a first communication protocol and the second packet conforms to a second legacy communication protocol different from the first communication protocol.

Embodiment 25: The communication device of any of embodiments 17-20, wherein the packet is a first packet, and wherein the one or more IC devices are further configured to: select a modulation and coding scheme (MCS) to be used for a second packet to be transmitted via the operating channel, including selecting the MCS based on the overall bandwidth of the operating channel; generate the second packet according to the selected MCS; and transmit the second packet via the operating channel.

Embodiment 26: The communication device of any of embodiments 17-20, wherein the packet is a first packet, and wherein the one or more IC devices are further configured to: select a modulation and coding scheme (MCS) to be used for a second packet to be transmitted via the operating channel, including selecting the MCS based on a number of sub-channels used in the operating channel; generate the second packet according to the selected MCS; and transmit the second packet via the operating channel.

Embodiment 27: The communication device any of embodiments 17-20, wherein the packet is a first packet, wherein the communication device is a first communication device, and wherein the one or more IC devices are further configured to, after transmitting the first packet: generate a request-to-send (RTS) frame; transmit the RTS frame to a second communication device via the operating channel, including not transmitting in the one or more sub-channels that are not used for the operating channel; receive a clear-to-send (CTS) frame from the second communication device via only a subset of sub-channels via the RTS frame was transmitted; and after receiving the CTS frame, transmit a second packet to the second communication device via the only the subset of sub-channels via which the CTS frame was received.

Embodiment 28: The communication device of any of embodiments 17-20, wherein the one or more IC devices are further configured to: generate the packet to include an information element that includes i) the first subfield that indicates the overall bandwidth of the operating channel, and ii) the second subfield that indicates the one or more sub-channels within the overall bandwidth that will not be used for the operating channel, wherein the information element is generated to include i) an element identifier (ID) field and ii) an element ID extension field that together indicate a format of the information element.

Embodiment 29: The communication device of embodiment 28, wherein the one or more IC devices are further configured to: set a third subfield of the information element to indicate that the information element includes the second subfield.

Embodiment 30: The communication device of embodiment 28, wherein: the second subfield includes a bitmap; respective bits in the bitmap correspond to respective sub-channels within the overall bandwidth; and values of bits in the bitmap indicate whether respective sub-channels within the overall bandwidth will be used for the operating channel.

Embodiment 31: The communication device of any of embodiments 17-30, wherein the communication device is an access point.

Embodiment 32: The communication device of any of embodiments 17-31, wherein the one or more IC devices are further configured to: determine i) a first frequency segment of the overall bandwidth and ii) a second frequency segment of the overall bandwidth, wherein the first frequency segment and the second frequency segment are separated by a gap in frequency; and generate the first subfield to indicate that the overall bandwidth comprises two frequency segments separated by a gap in frequency; and generate the packet to include i) a third subfield to indicate a first location in frequency of the first frequency segment and ii) a fourth subfield to indicate a second location in frequency of the second frequency segment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN), the method comprising:

determining, at an access point (AP) of the WLAN, an overall frequency bandwidth of an operating channel of the WLAN, wherein the overall frequency bandwidth spans a plurality of sub-channels;

determining, at the AP, one or more punctured sub-channels for the operating channel, the one or more punctured sub-channels disallowed for use in the WLAN, wherein the one or more punctured sub-channels are within the overall frequency bandwidth of the operating channel;

transmitting, by the AP, a first packet to one or more client stations of the WLAN, the first packet including information that specifies i) the overall frequency bandwidth of the operating channel, and ii) the one or more punctured sub-channels for the operating channel, wherein the first packet informs the one or more client stations of the operating channel for future transmissions by the one or more client stations;

receiving, at the AP, a second packet that includes a request-to-send (RTS) frame from a first client station among the one or more client stations, the second packet received via a plurality of sub-channels included in the operating channel, the plurality of sub-channels not including any of the one or more punctured sub-channels;

determining, at the AP, that one or more sub-channels among the plurality of sub-channels are not idle from the standpoint of the AP;

in response to receiving the second packet, transmitting, by the AP, a third packet that includes a clear-to-send (CTS) frame, the third packet transmitted via only a subset of sub-channels and indicating to the one or more client stations of the WLAN that the only the subset of sub-channels is reserved for a transmit opportunity (TXOP) of the first client station, the only the subset of sub-channels excluding the one or more sub-channels that are not idle from the standpoint of the AP; and after transmitting the third packet, receiving, at the AP, a fourth packet from the first client station via the only the subset of sub-channels.

2. The method of claim 1, further comprising:
generating, at the AP, the first packet to include a first subfield that indicates the overall frequency bandwidth of the operating channel, and ii) a second subfield that indicates the one or more punctured sub-channels of the operating channel.

3. The method of claim 2, further comprising:
generating, at the AP, a medium access control (MAC) management frame that includes i) the first subfield that indicates the overall frequency bandwidth of the operating channel, and ii) the second subfield that indicates the one or more punctured sub-channels;
wherein generating the first packet to include the first subfield and the second subfield comprises generating the first packet to include the MAC management frame.

4. The method of claim 3, wherein generating the MAC management frame that includes the first subfield and the second subfield comprises generating the MAC management frame as one of: i) a beacon frame, ii) a probe response frame, iii) an association response frame, and iv) a reassociation response frame.

5. The method of claim 1, wherein transmitting the first packet informs the one or more client stations that the operating channel, having the overall frequency bandwidth and the one or more punctured sub-channels, is to be used in the WLAN until the AP specifies a change to the operating channel.

6. The method of claim 1, wherein:
the one or more client stations are configured to operate according to a first communication protocol;
the operating channel is a first operating channel to be used by the one or more client stations;
the method further comprises: determining, at the AP, a frequency bandwidth of a second operating channel that is permitted by a legacy second communication protocol and that is to be used by one or more legacy client stations in the WLAN that operate according to the legacy second communication protocol, wherein the frequency bandwidth of the second operating channel is i) contiguous in frequency, ii) within the overall frequency bandwidth of the first operating channel, and iii) excludes the one or more punctured sub-channels of the first operating channel; and
one of:
  i) generating the first packet includes generating the first packet to include a subfield that indicates the frequency bandwidth of the second operating channel, and transmitting the first packet also informs the one or more legacy client stations of the second operating channel for future transmissions by the one or more legacy client stations, and
  ii) the method further comprises generating, at the AP, a fifth packet to include a subfield that indicates the frequency bandwidth of the second operating channel, and transmitting the fifth packet to inform the one or more legacy client stations of the second operating channel for future transmissions by the one or more legacy client stations.

7. The method of claim 1, wherein:
generating the first packet comprises generating the first packet to include a bitmap;
respective bits in the bitmap correspond to respective sub-channels; and
one or more respective values of bits in the bitmap indicate the one or more punctured sub-channels for the operating channel.

8. The method of claim 1, further comprising:
determining, at the AP, that the operating channel includes i) a first frequency segment having a) a first set of multiple sub-channels and b) an 80 MHz frequency bandwidth, and ii) a second frequency segment having a second set of multiple sub-channels, wherein the first set of multiple sub-channels of the first frequency segment includes a primary sub-channel of the WLAN;
wherein receiving the second packet that includes the RTS frame includes receiving the second packet via at least one sub-channel in the second set of multiple sub-channels in the second frequency segment; and
wherein the method further comprises:
  determining, at the AP, that at least one sub-channel in the second set of multiple sub-channels is idle, and
  in response to determining that at least one other sub-channel in the second set of multiple sub-channels is not idle from the standpoint of the AP, determining that the subset of sub-channels excludes the entire second frequency segment.

9. The method of claim 1, further comprising:
determining, at the AP, that the operating channel includes i) a first frequency segment having a) a first set of multiple sub-channels and b) an 80 MHz frequency bandwidth, and ii) a second frequency segment having a second set of multiple sub-channels, wherein the first set of multiple sub-channels of the first frequency segment includes a primary sub-channel of the WLAN;
wherein receiving the second packet that includes the RTS frame includes receiving the second packet via at least one sub-channel in the second set of multiple sub-channels in the second frequency segment; and
wherein the method further comprises:
  determining, at the AP, that at least one sub-channel in the second set of multiple sub-channels is idle,
  determining, at the AP, that at least one other sub-channel in the second set of multiple sub-channels is not idle from the standpoint of the AP, and
  determining that the subset of sub-channels i) includes the at least one sub-channel in the second set of multiple sub-channels that is idle, and ii) excludes the at least one other sub-channel in the second set of multiple sub-channels that is not idle.

10. The method of claim 9, wherein:
the RTS frame includes information specifying i) first sub-channels via which the first client station transmitted the second packet, and ii) one or more second sub-channels via which the first client station did not transmit the second packet; and
the method further comprises generating, at the AP, the CTS frame to include information specifying i) third sub-channels via which the AP is transmitting the third packet, and ii) fourth sub-channels via which the AP is not transmitting the third packet.

11. The method of claim 10, wherein:
the RTS frame includes a first bitmap with respective first bits in the first bitmap corresponding to respective sub-channels, the first bitmap including i) a first set of first bits set to a first value to indicate the first sub-channels via which the first client station transmitted the second packet, and ii) a second set of one or more first bits set to a second value to indicate the one or more second sub-channels via which the first client station did not transmit the second packet; and generating the CTS frame includes generating the CTS frame to include a second bitmap with respective second bits in the second bitmap corresponding to respective sub-channels, the second bitmap including i) a first set of second bits set to the first value to indicate the third sub-channels via which the AP is transmitting the third packet, and ii) a second set of second bits set to the second value to indicate the fourth sub-channels via which the AP is not transmitting the third packet.

12. An access point (AP), comprising:

a wireless network interface device implemented using one or more integrated circuit (IC) devices, wherein the wireless network interface device is configured to:

determine an overall frequency bandwidth of an operating channel of a wireless local area network (WLAN), wherein the overall frequency bandwidth spans a plurality of sub-channels, determine one or more punctured sub-channels for the operating channel, the one or more punctured sub-channels disallowed for use in the WLAN, wherein the one or more punctured sub-channels are within the overall frequency bandwidth of the operating channel, transmit a first packet to one or more client stations of the WLAN, the first packet including information that specifies i) the overall frequency bandwidth of the operating channel, and ii) the one or more punctured sub-channels for the operating channel, wherein the first packet informs the one or more client stations of the operating channel for future transmissions by the one or more client stations, receive a second packet that includes a request-to-send (RTS) frame from a first client station among the one or more client stations, the second packet received via a plurality of sub-channels included in the operating channel, the plurality of sub-channels not including any of the one or more punctured sub-channels, determine that one or more sub-channels among the plurality of sub-channels are not idle from the standpoint of the AP, in response to receiving the second packet, transmit a third packet that includes a clear-to-send (CTS) frame, the third packet transmitted via only a subset of sub-channels and indicating to the one or more client stations of the WLAN that the only the subset of sub-channels is reserved for a transmit opportunity (TXOP) of the first client station, the only the subset of sub-channels excluding the one or more sub-channels that are not idle from the standpoint of the AP, and after transmitting the third packet, receive a fourth packet from the first client station via the only the subset of sub-channels.

13. The AP of claim 12, wherein the wireless network interface device is configured to:

generate the first packet to include a first subfield that indicates the overall frequency bandwidth of the operating channel, and ii) a second subfield that indicates the one or more punctured sub-channels of the operating channel.

14. The AP of claim 13, wherein the wireless network interface device is configured to:

generate a medium access control (MAC) management frame that includes i) the first subfield that indicates the overall frequency bandwidth of the operating channel, and ii) the second subfield that indicates the one or more punctured sub-channels; and generate the first packet to include the MAC management frame.

15. The AP of claim 14, wherein the wireless network interface device is configured to generate the MAC management frame as one of: i) a beacon frame, ii) a probe response frame, iii) an association response frame, and iv) a reassociation response frame.

16. The AP of claim 12, wherein the wireless network interface device is configured to transmit the first packet to inform the one or more client stations that the operating channel, having the overall frequency bandwidth and the one or more punctured sub-channels, is to be used in the WLAN until the AP specifies a change to the operating channel.

17. The AP of claim 12, wherein:

the one or more client stations are configured to operate according to a first communication protocol;

the operating channel is a first operating channel to be used by the one or more client stations;

the wireless network interface device is further configured to determine a frequency bandwidth of a second operating channel that is permitted by a legacy second communication protocol and that is to be used by one or more legacy client stations in the WLAN that operate according to the legacy second communication protocol, wherein the frequency bandwidth of the second operating channel is i) contiguous in frequency, ii) within the overall frequency bandwidth of the first operating channel, and iii) excludes the one or more punctured sub-channels of the first operating channel; and wherein the wireless network interface device is further configured to, one of:

i) generate the first packet includes generating the first packet to include a subfield that indicates the frequency bandwidth of the second operating channel, and transmit the first packet to also inform the one or more legacy client stations of the second operating channel for future transmissions by the one or more legacy client stations, and ii) generate a fifth packet to include a subfield that indicates the frequency bandwidth of the second operating channel, and transmit the fifth packet to inform the one or more legacy client stations of the second operating channel for future transmissions by the one or more legacy client stations.

18. The AP of claim 12, wherein:

the wireless network interface device is further configured to generate the first packet to include a bitmap;

respective bits in the bitmap correspond to respective sub-channels; and one or more respective values of bits in the bitmap indicate the one or more punctured sub-channels for the operating channel.

19. The AP of claim 12, the wireless network interface device is further configured to:

determine that the operating channel includes i) a first frequency segment having a) a first set of multiple sub-channels and b) an 80 MHz frequency bandwidth, and ii) a second frequency segment having a second set of multiple sub-channels, wherein the first set of multiple sub-channels of the first frequency segment includes a primary sub-channel of the WLAN;

receive the second packet via at least one sub-channel in the second set of multiple sub-channels in the second frequency segment;

determine that at least one sub-channel in the second set of multiple sub-channels is idle; and in response to the wireless network interface device determining that at least one other sub-channel in the second set of multiple sub-channels is not idle from the standpoint of the AP, determine that the subset of sub-channels excludes the entire second frequency segment.

20. The AP of claim 12, wherein the wireless network interface device is further configured to:

determine that the operating channel includes i) a first frequency segment having a) a first set of multiple sub-channels and b) an 80 MHz frequency bandwidth, and ii) a second frequency segment having a second set of multiple sub-channels, wherein the first set of multiple sub-channels of the first frequency segment includes a primary sub-channel of the WLAN;

receive the second packet via at least one sub-channel in the second set of multiple sub-channels in the second frequency segment;

determine that at least one sub-channel in the second set of multiple sub-channels is idle;

determine that at least one other sub-channel in the second set of multiple sub-channels is not idle from the standpoint of the AP; and determine that the subset of sub-channels i) includes the at least one sub-channel in the second set of multiple sub-channels that is idle, and ii) excludes the at least one other sub-channel in the second set of multiple sub-channels that is not idle.

21. The AP of claim 20, wherein:

the RTS frame includes information specifying i) first sub-channels via which the first client station transmitted the second packet, and ii) one or more second sub-channels via which the first client station did not transmit the second packet; and the wireless network interface device is further configured to generate the CTS frame to include information specifying i) third sub-channels via which the AP is transmitting the third packet, and ii) fourth sub-channels via which the AP is not transmitting the third packet.

22. The AP of claim 21, wherein:

the RTS frame includes a first bitmap with respective first bits in the first bitmap corresponding to respective sub-channels, the first bitmap including i) a first set of first bits set to a first value to indicate the first sub-channels via which the first client station transmitted the second packet, and ii) a second set of one or more first bits set to a second value to indicate the one or more second sub-channels via which the first client station did not transmit the second packet; and the wireless network interface device is further configured to generate the CTS frame to include a second bitmap with respective second bits in the second bitmap corresponding to respective sub-channels, the second bitmap including i) a first set of second bits set to the first value to indicate the third sub-channels via which the AP is transmitting the third packet, and ii) a second set of second bits set to the second value to indicate the fourth sub-channels via which the AP is not transmitting the third packet.

23. The AP of claim 12, wherein the network interface device comprises one or more transceivers using the one or more IC devices, the one or more transceivers configured to:

transmit the first packet;
receive the second packet;
transmit the third packet; and
receive the fourth packet.

24. The AP of claim 23, further comprising:

one or more antennas coupled to the one or more transceivers.

* * * * *